United States Patent
Zhang et al.

(10) Patent No.: US 10,831,648 B2
(45) Date of Patent: Nov. 10, 2020

(54) INTERMITTENT FAILURE METRICS IN TECHNOLOGICAL PROCESSES

(71) Applicant: Splunk Inc., San Francisco, CA (US)

(72) Inventors: Jian Zhang, Shanghai (CN); Minghao Lu, Shanghai (CN); Xiaolu Ye, Shanghai (CN); Ning He, Shanghai (CN)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 16/263,363

(22) Filed: Jan. 31, 2019

(65) Prior Publication Data

US 2019/0243753 A1   Aug. 8, 2019

Related U.S. Application Data

(63) Continuation of application No. PCT/CN2018/075377, filed on Feb. 6, 2018.

(51) Int. Cl.
*G06F 9/44* (2018.01)
*G06F 11/36* (2006.01)
(Continued)

(52) U.S. Cl.
CPC ........ *G06F 11/3692* (2013.01); *G06F 9/4843* (2013.01); *G06F 9/5005* (2013.01);
(Continued)

(58) Field of Classification Search
CPC .. G06F 9/4843; G06F 9/5005; G06F 11/3664; G06F 11/368; G06F 11/3684; G06F 17/11; G06F 9/542
(Continued)

(56) References Cited

U.S. PATENT DOCUMENTS

| 2011/0107146 A1 | 5/2011 | Bose et al. |
| 2013/0152047 A1* | 6/2013 | Moorthi ............... G06F 11/368 717/124 |
| 2017/0068609 A1 | 3/2017 | Chavez et al. |

FOREIGN PATENT DOCUMENTS

| CN | 104951400 A | 9/2015 |
| CN | 106657514 A | 5/2017 |

OTHER PUBLICATIONS

"International Application Serial No. PCT/CN2018/075377, International Search Report dated Nov. 8, 2018", 4 pgs.

(Continued)

*Primary Examiner* — Chuck O Kendall
(74) *Attorney, Agent, or Firm* — Schwegman Lundberg & Woessner, P.A.

(57) ABSTRACT

Systems and methods for testing a subject system with a software testing process are described. The system receives Boolean states responsive to repeatedly applying a first test case to a subject system. Each Boolean state signifies an outcome of an application of the first test case to a version of a first software feature over a span of time. The system identifies test case outcomes for the first test case that are adjacent in time and different and generates an intermittency value for the first test case. The system determines that the intermittency value for the first test case exceeds an intermittency threshold and alerts an engineering resource. Finally, the system repeats the above operations until the intermittency value for the first test case does not exceed the intermittency threshold.

29 Claims, 37 Drawing Sheets

(51) Int. Cl.
  *G06F 9/50*   (2006.01)
  *G06F 17/11*  (2006.01)
  *G06F 9/48*   (2006.01)
  *G06F 9/54*   (2006.01)

(52) U.S. Cl.
  CPC ........ *G06F 11/368* (2013.01); *G06F 11/3664* (2013.01); *G06F 11/3684* (2013.01); *G06F 17/11* (2013.01); *G06F 9/542* (2013.01)

(58) Field of Classification Search
  USPC ........................................................ 717/124
  See application file for complete search history.

(56) References Cited

OTHER PUBLICATIONS

"International Application Serial No. PCT/CN2018/075377, Written Opinion dated Nov. 8, 2018", 4 pgs.

\* cited by examiner

| Time 535 | Host 536 | Source 537 | Source Type 538 | Event 539 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

Fig. 5C

| Data Summary | | | |
|---|---|---|---|
| Hosts (5) | Sources (8) | Sourcetypes (3) | |
| filter | | | |
| Host ≎ | | Count ≎ | Last Update ≎ |
| mailsv | all ∨ | 9,829 | 4/29/14 1:32:47.000 PM |
| vendor_sales | all ∨ | 30,244 | 4/29/14 1:32:46.000 PM |
| www1 | all ∨ | 24,221 | 4/29/14 1:32:44.000 PM |
| www2 | all ∨ | 22,595 | 4/29/14 1:32:47.000 PM |
| www3 | all ∨ | 22,975 | 4/29/14 1:32:45.000 PM |

Fig. 8B $$\text{Severity Value} = B \sum_{i=0}^{L-1} F_i e^{-u(L-1-i)}$$

Fig. 9E

INTERMITTENT FAILURE METRICS IN TECHNOLOGICAL PROCESSES

RELATED APPLICATIONS

This patent application is a Continuation of PCT Patent Application No. PCT/CN2018/075377, filed Feb. 6, 2018, which application is incorporated herein by reference in their entirety.

TECHNICAL FIELD

Embodiments of the present disclosure relate generally to data processing and, more particularly, but not by way of limitation, to intermittent failure metrics in technological processes.

BACKGROUND

Many technological processes incorporate testing as part of their methodology. Various metrics are utilized to characterize and quantify test results leading to more efficient and better processes.

BRIEF DESCRIPTION OF THE DRAWINGS

Various ones of the appended drawings merely illustrate example embodiments of the present disclosure and cannot be considered as limiting its scope.

FIG. 5C provides a visual representation of the manner in which a pipelined search language or query operates, in accordance with example embodiments;

FIG. 8B is an interface diagram of an example user interface for a data summary dialog that enables a user to select various data sources, in accordance with example embodiments;

FIG. 9E is a block diagram illustrating a severity metric, according to an example embodiment;

Figure 1:
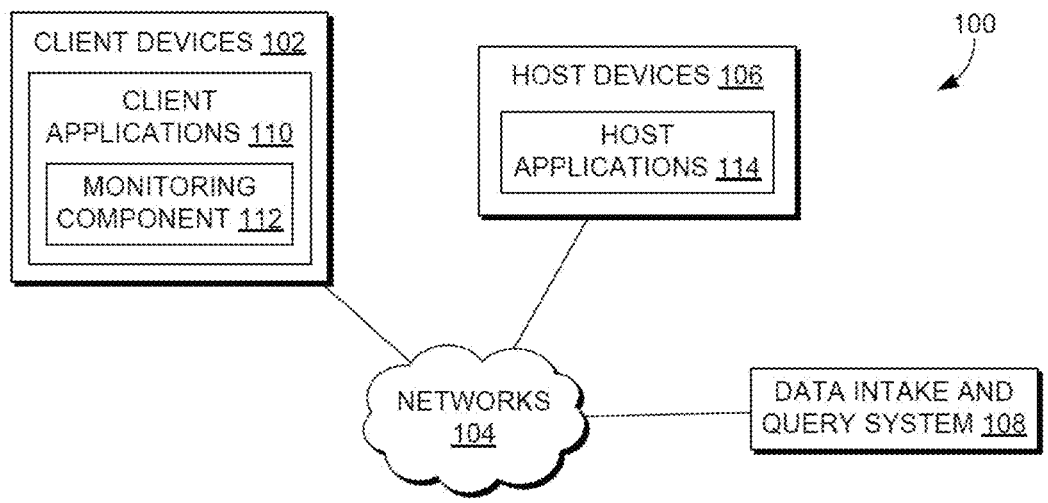
FIG. 1 is a block diagram of an example networked computer environment, in accordance with example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative example embodiments of the disclosure. In the following description, for the purposes of explanation, numerous specific details are set forth in order to provide an understanding of various example embodiments. It will be evident, however, to those skilled in the art, that example embodiments of the subject matter herein may be practiced without these specific details. In general, well-known instruction instances, protocols, structures, and techniques are not necessarily shown in detail.

Embodiments are described herein according to the following outline:
1.0. General Overview
2.0. Operating Environment
   2.1. Host Devices
   2.2. Client Devices
   2.3. Client Device Applications
   2.4. Data Server System
   2.5 Cloud-Based System Overview
   2.6 Searching Externally-Archived Data
   2.6.1. ERP Process Features
   2.7. Data Ingestion
   2.7.1. Input
   2.7.2. Parsing
   2.7.3. Indexing
   2.8. Query Processing
   2.9. Pipelined Search Language
   2.10. Field Extraction
   2.11. Example Search Screen

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

Figure 2:
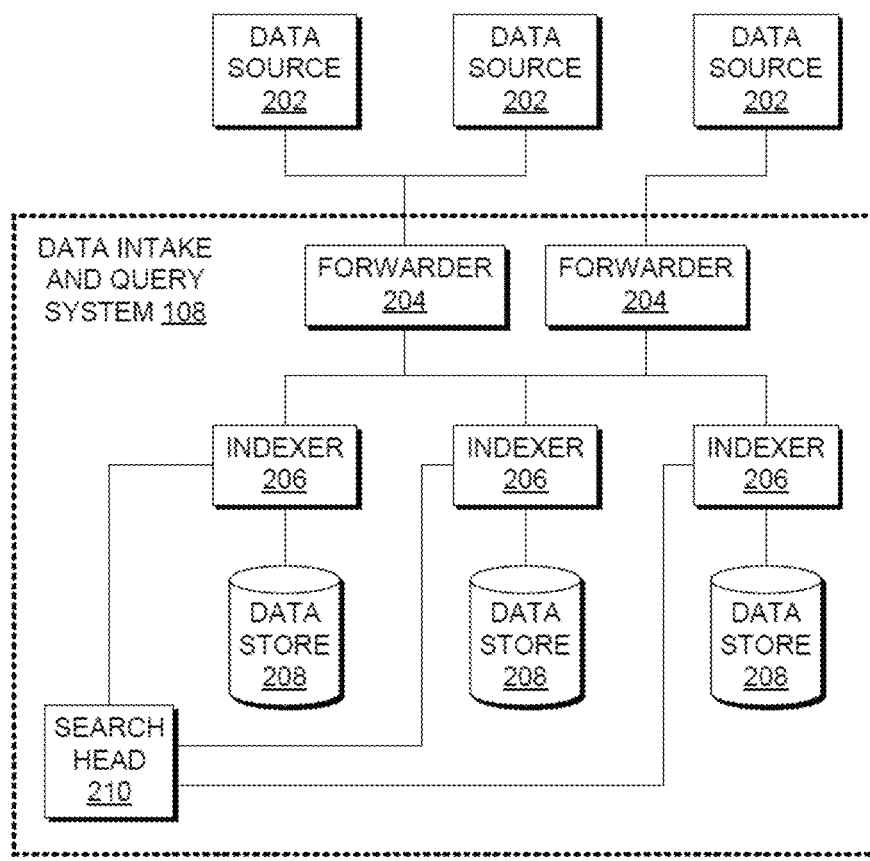
FIG. 2 is a block diagram of an example data intake and query system, in accordance with example embodiments.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data. 2.4. DATA SERVER SYSTEM FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 206 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
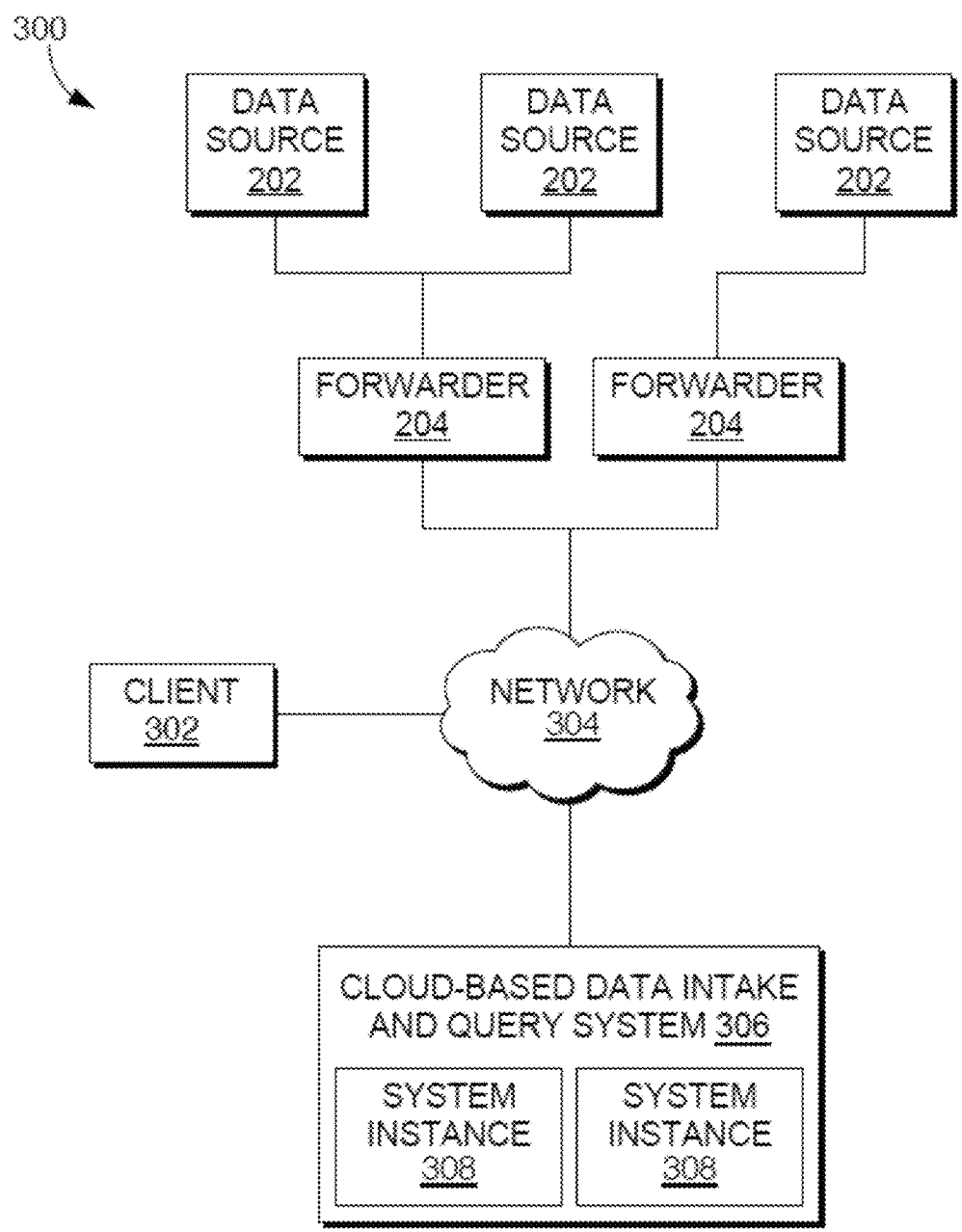
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 108, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6. Searching Externally-Archived Data

Figure 4:
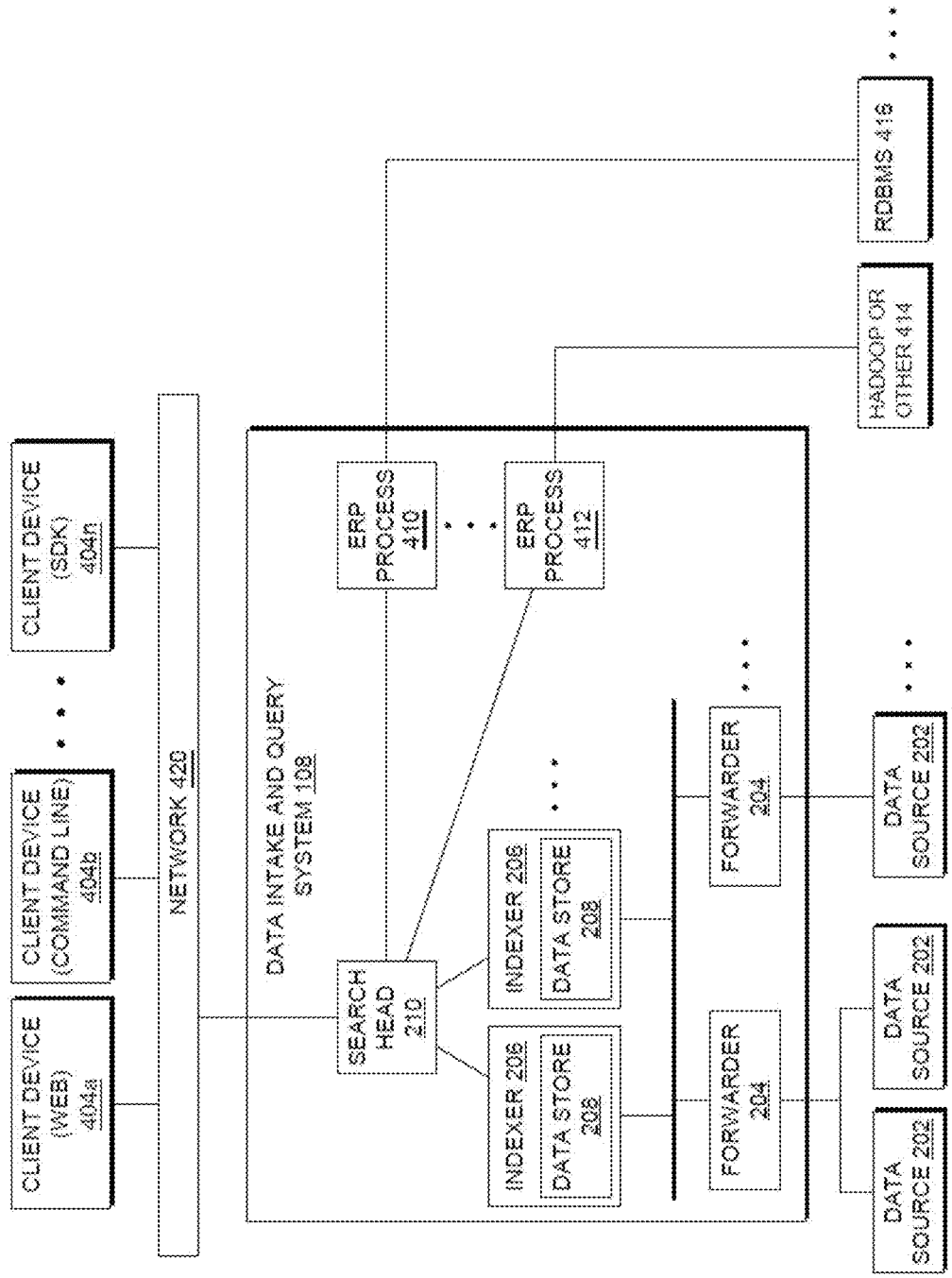
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS)) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX," issued on 25 Jul. 2013, U.S. patent application Ser. No. 14/266,832, entitled "PROCESSING A SYSTEM SEARCH REQUEST ACROSS DISPARATE DATA COLLECTION SYSTEMS," filed on 1 May 2014, and U.S. Pat. No. 9,514,189, entitled "PROCESSING A SYSTEM SEARCH REQUEST INCLUDING EXTERNAL DATA SOURCES," issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
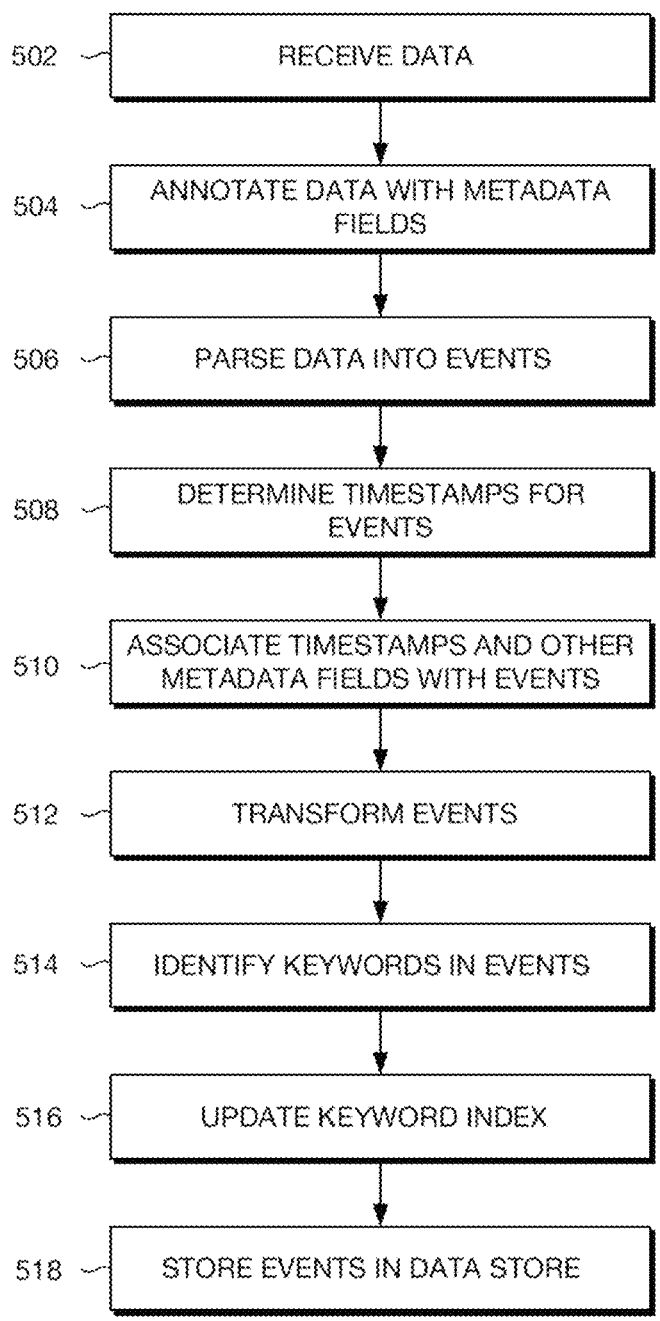
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the operations of the processes illustrated in FIG. 5A may be removed or that the ordering of the operations may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing operations across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing operations.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing operations. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 531, 532, and 533 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

Figure 5B:
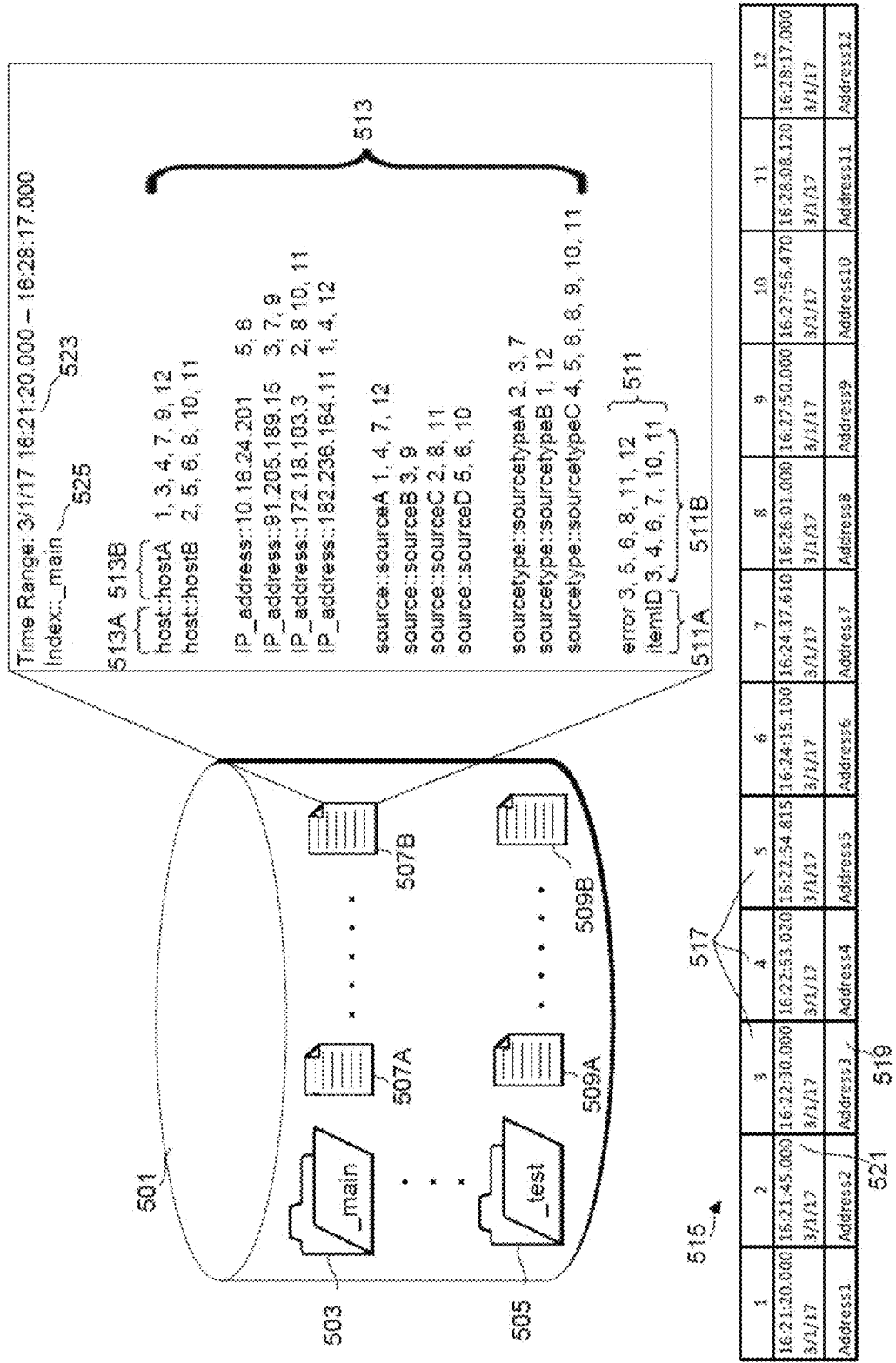
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index_main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error."

Similarly, the indexer can identify other event references located in other token entries or field-value pair entries that match the filter criteria. The system can identify event references located in all of the entries identified by the filter criteria. For example, if the filter criteria include the token "error" and field-value pair source e::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessio- nID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)
Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with a partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

Figure 6A:
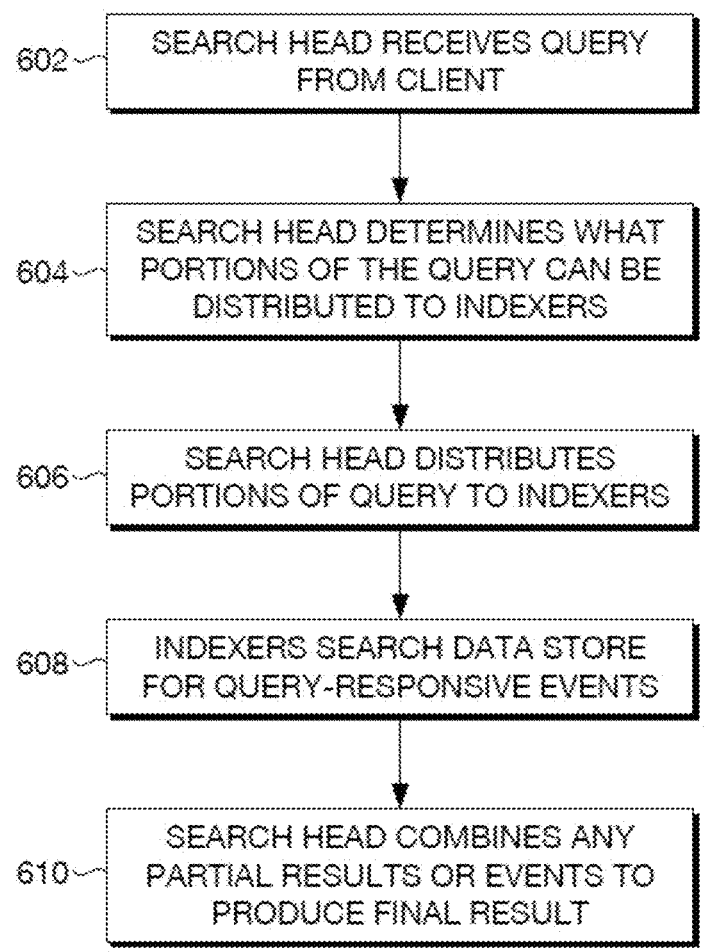
FIG. 6A is a flowchart of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each operation along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" operation by retrieving a set of data based on a condition (e.g., records associated with server response times of less than 1 microsecond). The results of the filtering operation can then be passed to a subsequent command in the pipeline that performs a "processing" operation (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
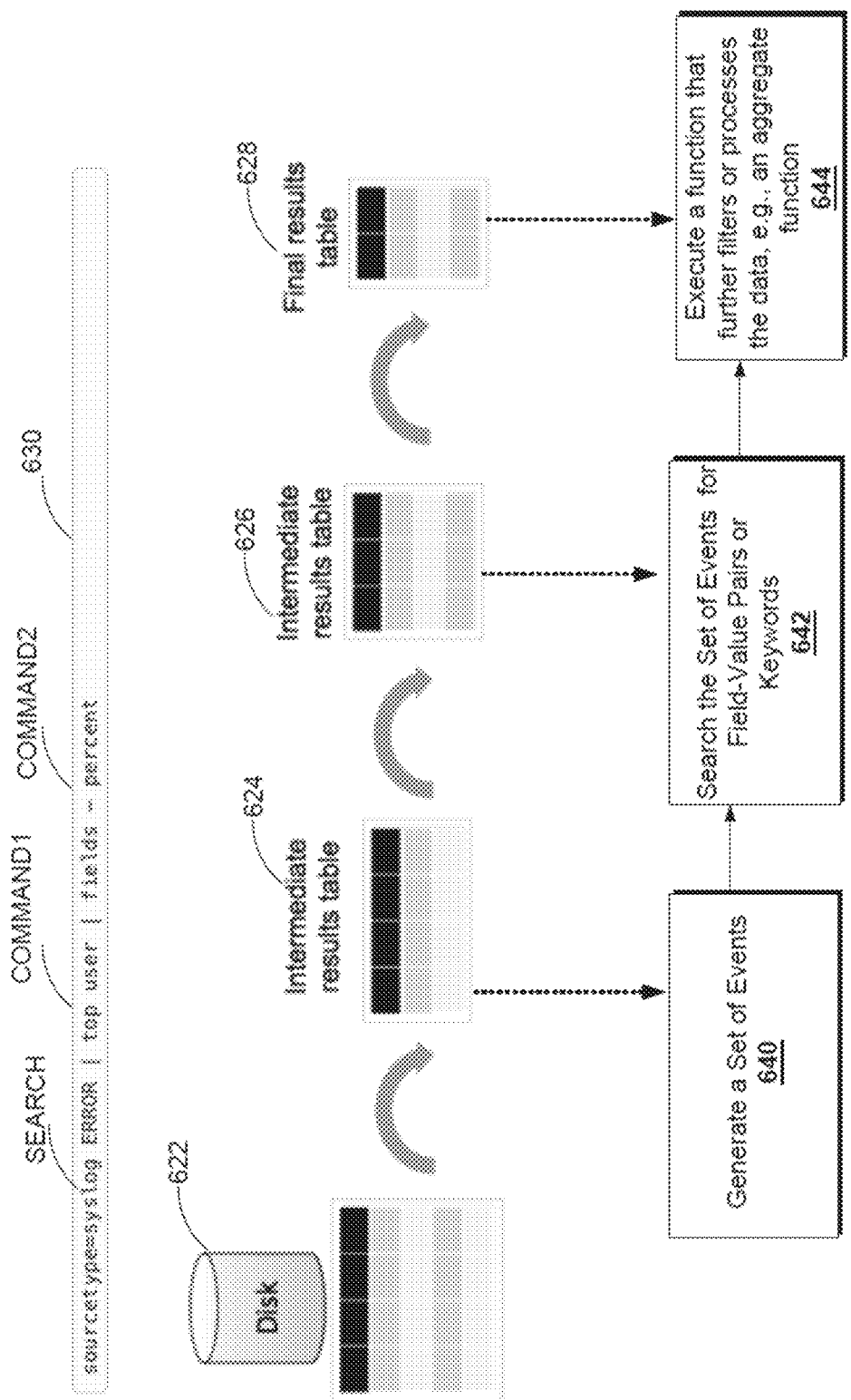
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search operation.

Disk 622 represents the event data in the raw record data store.

When a user query is processed, a search operation will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search operation, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields-percent" part of command 630 removes the column that shows the percentage, thereby, leaving a final results table 628 without a percentage column. In different embodiments, other query languages, such as the Structured Query Language ("SQL"), can be used to create a query.

2.10. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "1" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
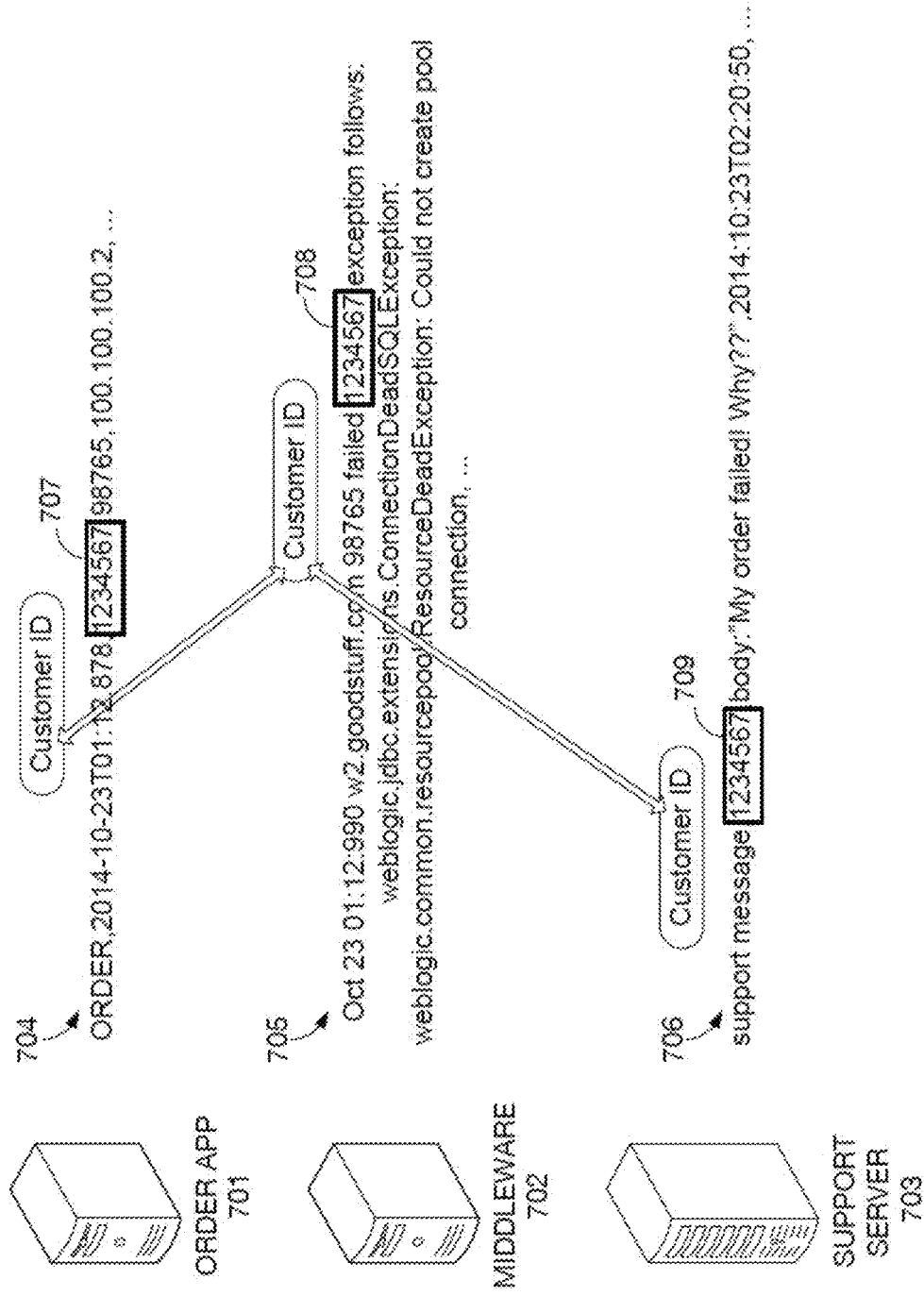
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
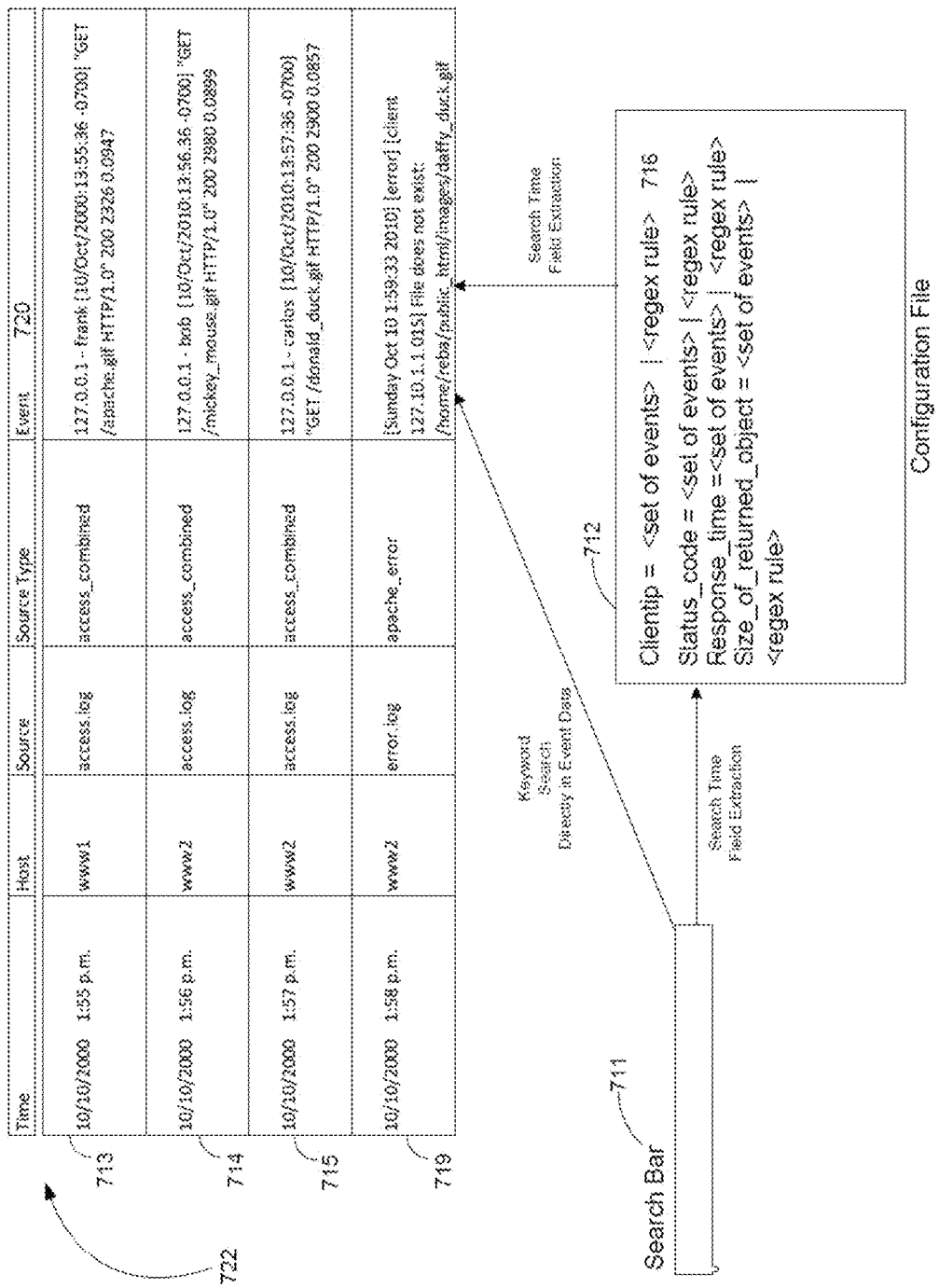
FIG. 7B illustrates an example of processing keyword searches and field searches, in accordance with disclosed embodiments.
Figure 7C:
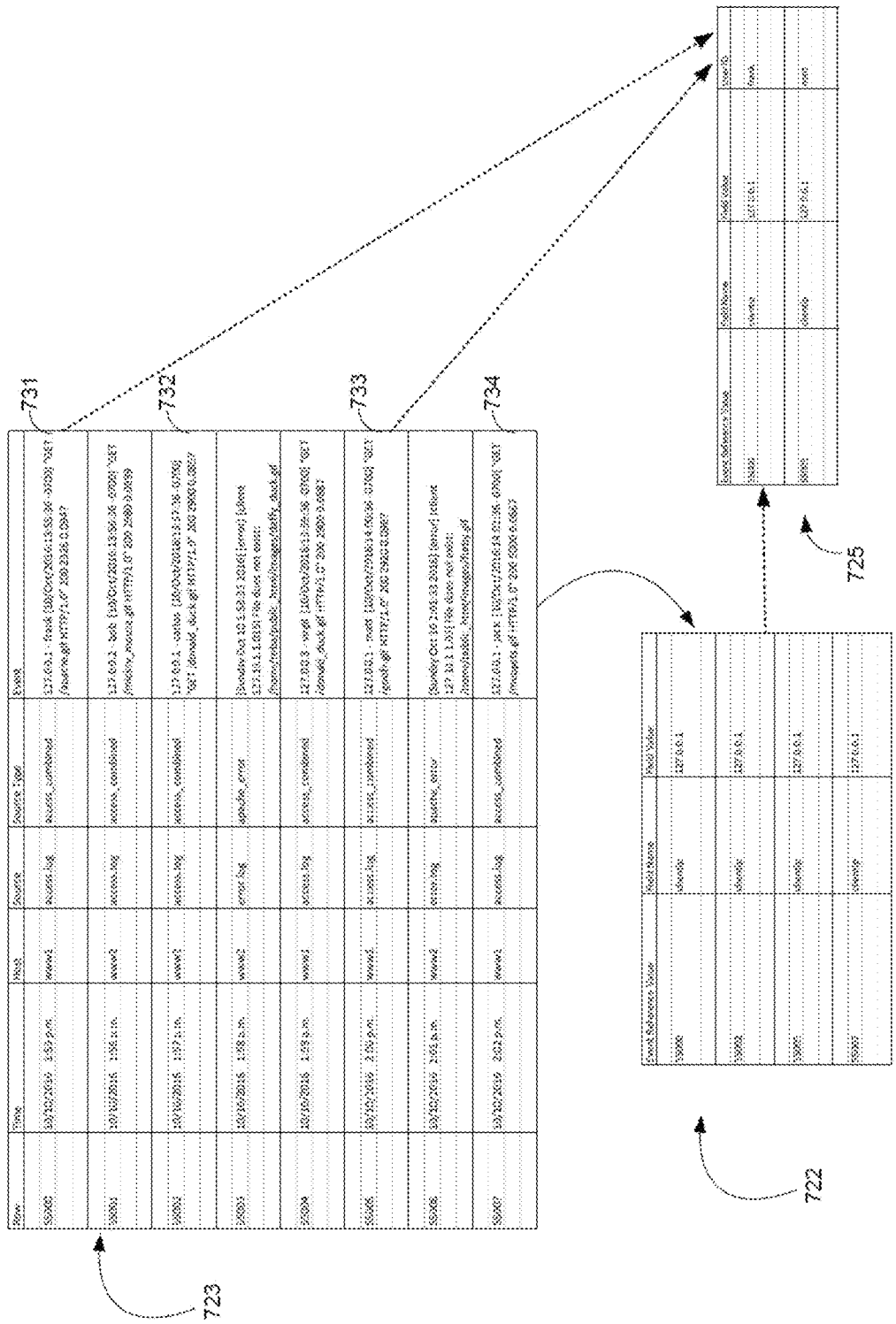
FIG. 7C illustrates an example of creating and using an inverted index, in accordance with example embodiments.
Figure 7D:
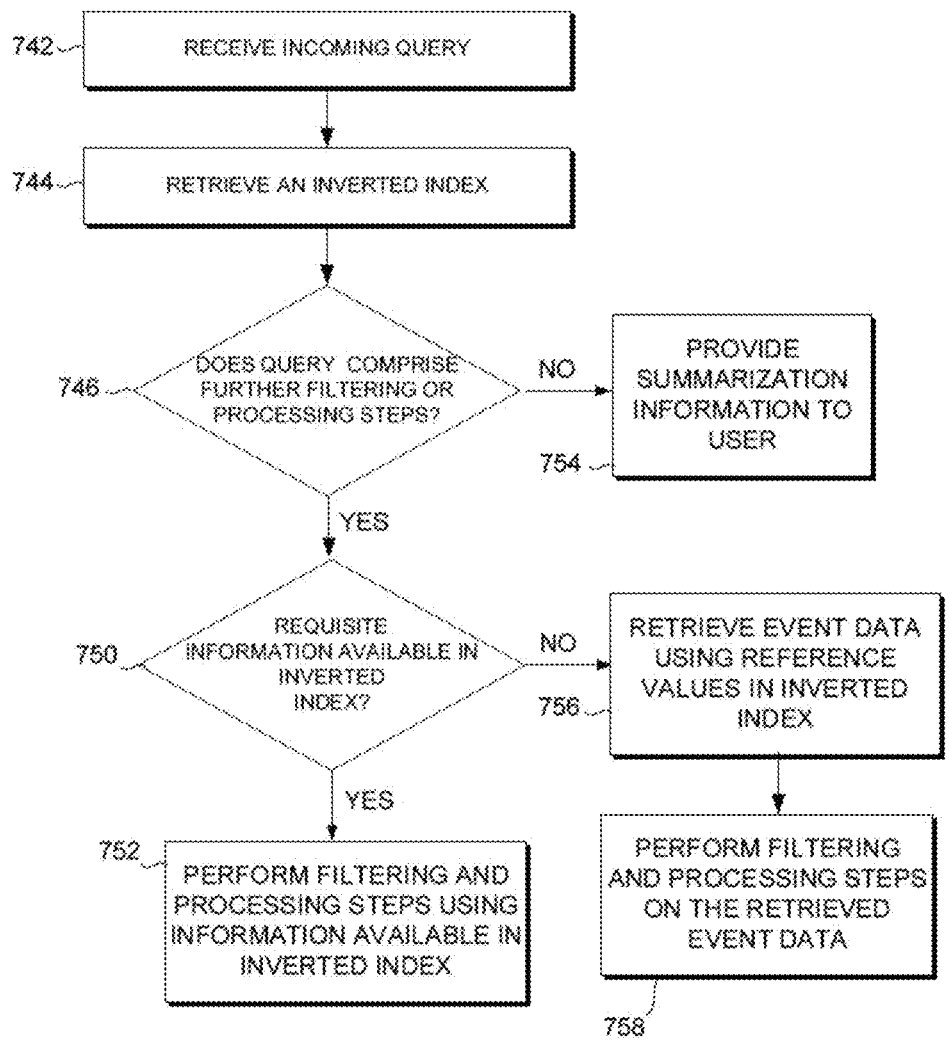
FIG. 7D depicts a flowchart of example use of an inverted index in a pipelined search query, in accordance with example embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store. If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 712 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering operation to a processing operation using a pipelined search language. Using the prior example, a user could pipeline the results of the compare operation to an aggregate function by asking the query search engine to count the number of events where the "clientip" field equals "127.0.0.1."

2.11. Example Search Screen

Figure 8A:
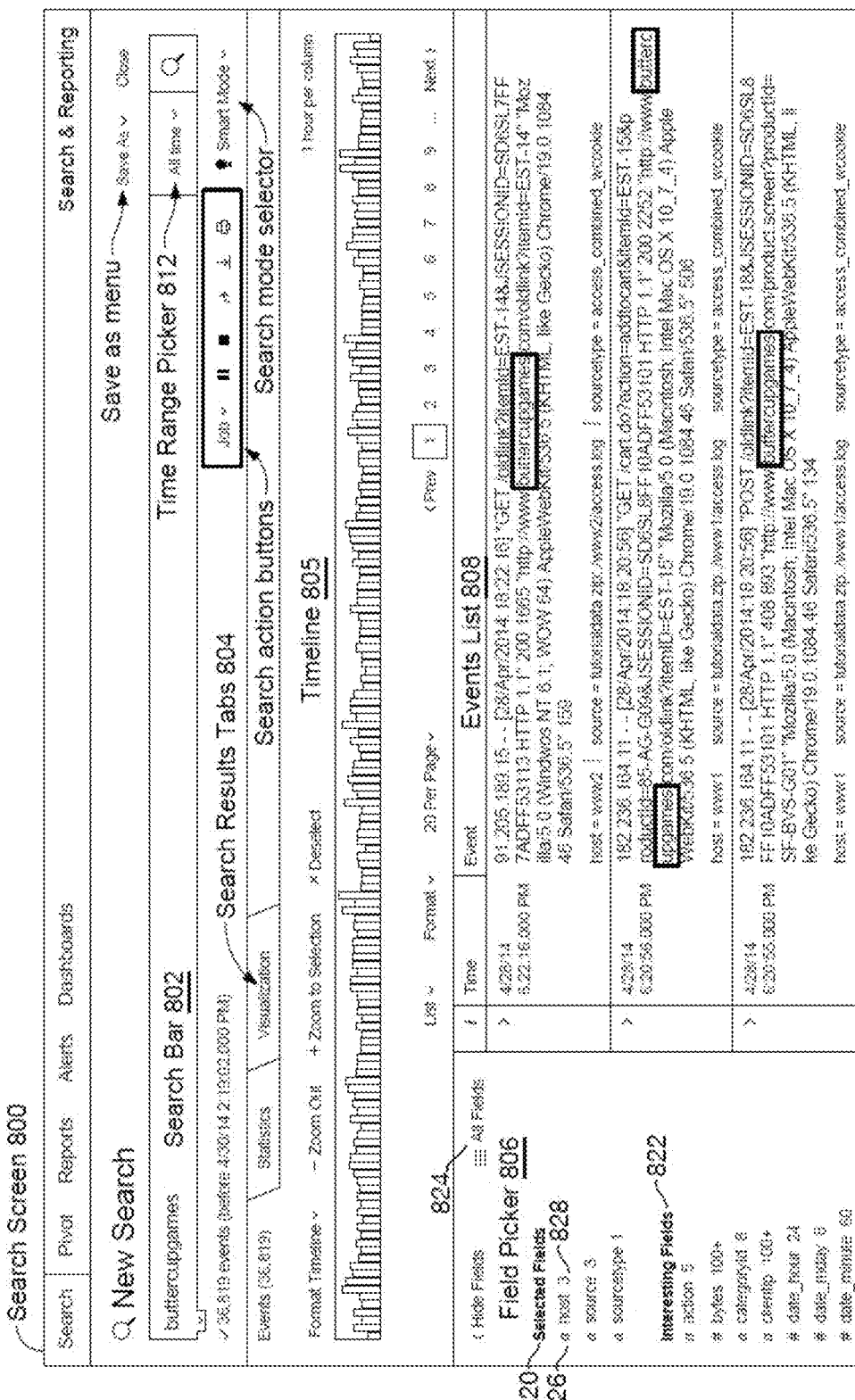
FIG. 8A is an interface diagram of an example user interface for a search screen, in accordance with example embodiments.

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline graph 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has preselected for display (e.g., host, source, sourcetype) and may also display any Interesting Fields 822 that the system determines may be interesting to the user based on prespecified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

Intermittent Failure Metrics in Technological Processes

Figure 9A:
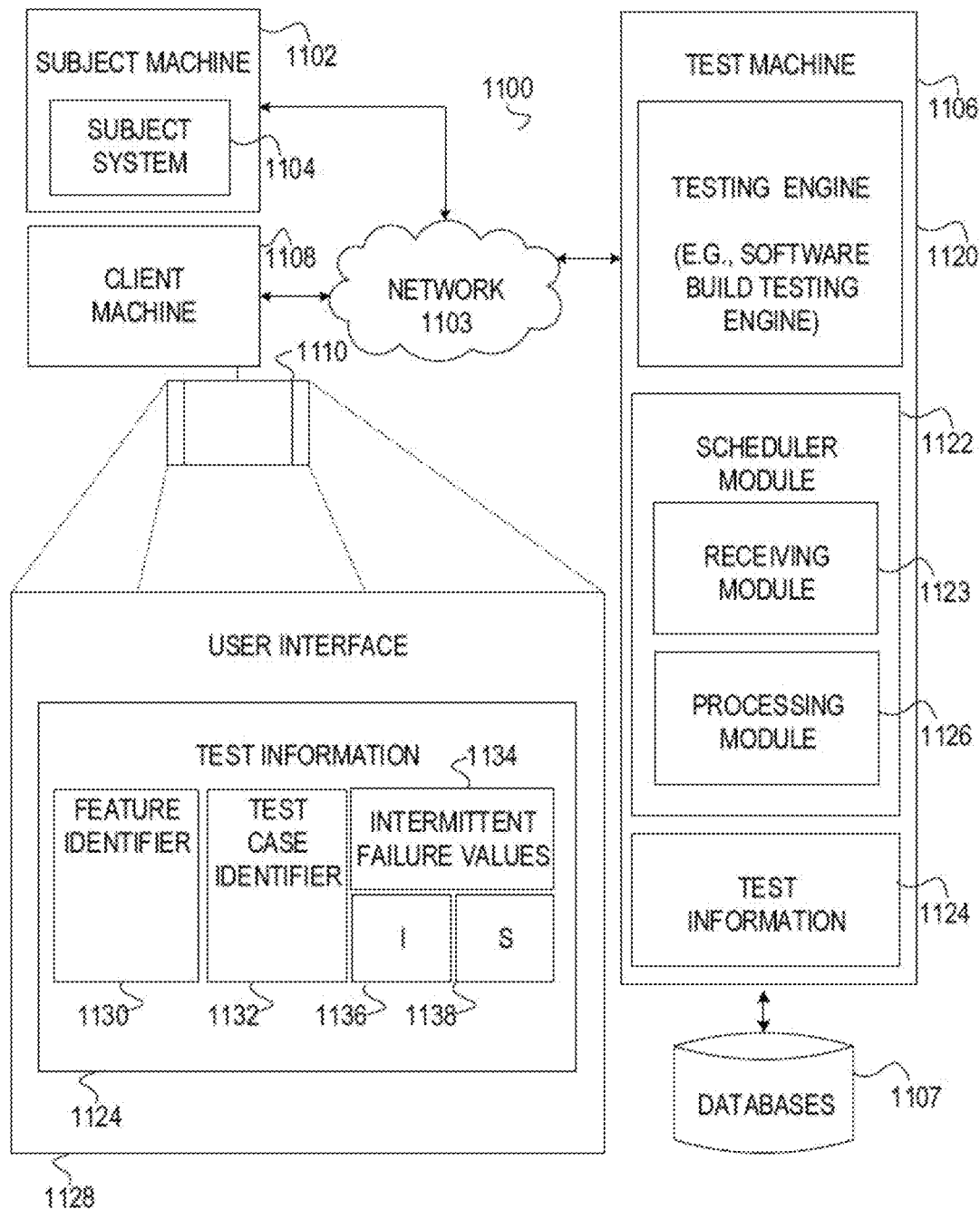
FIG. 9A is a block diagram illustrating an improved system for testing a subject system in a software testing process utilizing one or more digital computers, according to an example embodiment.

FIG. 9A is a block diagram illustrating a system 1100, according to an example embodiment, that is improved for testing a subject system with a software testing process utilizing one or more digital computers. The system 1100 may include a subject machine 1102 including a subject system 1104 for communicating, over a network 1103, with a client machine 1108 and a test machine 1106 that is coupled to a database 1107. The test machine 1106 may be utilized to implement a technological process including an automated test process for testing and repairing intermittent failures in the subject system 1104. The test process may include system tests for testing the subject system 1104 and unit tests for testing sub-systems of the subject system 1104. According to one embodiment, multiple iterations of the subject system 1104 (e.g., software build system) may be sequentially built as different versions and loaded into the subject machine 1102 for testing, over a span of time, to yield "PASS" or "FAIL" statuses that, in turn, are registered as test information by the testing engine 1120 (e.g., software build testing engine) on the test machine 1106. The test machine 1106 may utilize the test information and intermittent failure metrics to generate and display intermittent failure values that are displayed on a client monitor 1110 that is coupled to the client machine 1108. In addition, the test machine 1106 may utilize the intermittent failure values that have exceed a predetermined threshold to alert one or more engineering resources to improve the subject system 1104. For example, alerting the engineering resources may include scheduling engineering resources to perform tasks. One task may include dispatching an engineer to work on an intermittent failure identified by feature number and case number. The engineering resources may, in turn, generate a repair in the form of a software fix that is integrated into the subject system 1104 before being loaded into the subject machine 1102 and retested with the test machine 1106 until intermittent failure values do not exceed the threshold. That is, the test machine 1106 is enabled to identify, prioritize, and assign tasks that are not otherwise identified, prioritized, nor assigned unless the intermittent failures are monitored and digitally quantified with intermittent failure metrics. Accordingly, an existing technological process for developing a software build system is being improved by allowing the automation of further tasks.

The system 1100 is described in more detail. The test machine 1106 may include a testing engine 1120, a scheduler module 1122, and test information 1124. The testing engine 1120 may be utilized to automatically execute tests (e.g., scripts, modules, applications, etc.) and to register test results in the form of Boolean states (e.g., "pass" or "fail") in the test information 1124. The scheduler module 1122 may include a receiving module 1123 to receive the test results from the testing engine 1120 and a processing module 1126 to process the test results. The test information may include a status array (not shown) for storing status elements that correspond to the test results (e.g., "PASS" or "FAIL"), a gap array (not shown) for storing gap elements that correspond to adjacent status elements in the status array registering a change (e.g., "PASS" "FAIL" or "FAIL" "PASS"), and tasks that are scheduled responsive to the intermittent failure values exceeding a threshold.

The system 1100 may operate as follows. The testing engine 1120 may load the subject system 1104 in the subject machine 1102, perform tests on the subject system 1104, and communicate the test results to the receiving module 1123. The receiving module 1123 may receive the test results and communicate the test results to the processing module 1126. The processing module 1126 may store the test results in the status elements of the status array, generate the gap array based on the status array, generate the intermittent failure values based on the intermittent failure metrics, alert engineering resources based on the intermittent failure values, and display a user interface 1128 on the client machine 1108. For example, the user interface 1128 may include multiple rows of test information 1124, each row including a feature identifier 1130, a test case identifier 1132, and intermittent failure values 1134 including an intermittency value 1136 ("I") that was generated with an intermittency metric and a severity value 1138 ("S") that was generated with a severity metric. The feature identifier 1130 may uniquely identify a feature of the sub-system of the subject system 1104 or a feature of the subject system 1104. For example, features in the subject system 1104 may include accessing the subject system 1104 via user interfaces, storage and retrieval of values by the subject system 1104, etc. The test case identifier 1132 may identify a test script including operations for execution by the testing engine 1120.

Intermittency Metric

A frequency of status change (intermittency) resulting from repeated application of the same test on the same system indicates instability in the system. For example, two applications of the same test to the same system may yield the status changes ("PASS," "FAIL") or ("FAIL," "PASS"). Here, the status changes may be caused by intermittent failures in the system and are appropriately characterized as "flaky." In software testing, the expression "flaky test" may be used to describe this phenomenon. The expression "flaky test" means the outcome of a software test for the same software version is non-deterministic. Specifically, if the software in the subject system 1104 (e.g., software system) is the same, an expectation for an iterated test is always PASS or FAIL. Failure to meet this expectation is characterized as non-deterministic or "flaky."

In testing a software system, status changes may be collected by executing a test and analysing expected output in system logs, crash reports, or test reports. Nevertheless, in fixing the software system the observed intermittent failures are typically hard to reproduce. Further, an intermittent failure is difficult to find, easy to overlook, and not possible to track with existing metrics. Accordingly, a definition of metrics for measuring intermittent failures may improve the various technological processes that are utilized for finding, tracking, prioritizing, and fixing intermittent failures. The intermittent failure metrics may be utilized to generate the intermittency value 1136 and the severity value 1138 as measures of "flakiness." The intermittent failure values 1134 may be utilized by an engineering team to identify and resolve high impact intermittent failures.

Measurement of Intermittency

A status "GOOD=1" and a status "BAD=0" may be defined to enable processing test results with the test machine 1106. Further, this definition enables a status series for the subject system 1104 to be represented with the status array. Testing a subject system 1104, such as a software build system, may yield a software build status list including a status series of [BAD, BAD, BAD, BAD, BAD, GOOD, GOOD, GOOD, GOOD, GOOD] for the recent ten builds, the corresponding status array being, [0, 0, 0, 0, 0, 1, 1, 1, 1, 1]. Further, a gap between each two adjacent elements in the status array may be computed and registered in the gap array as [0, 0, 0, 0, 1, 0, 0, 0, 0]. It may be observed that the gap array for the immediate status array registers "1" responsive to an identification of different statuses in adjacent status elements of the status array (e.g., corresponding to the gap between the fifth element ("BAD") and sixth element ("GOOD") of the status array).

Figure 9B:
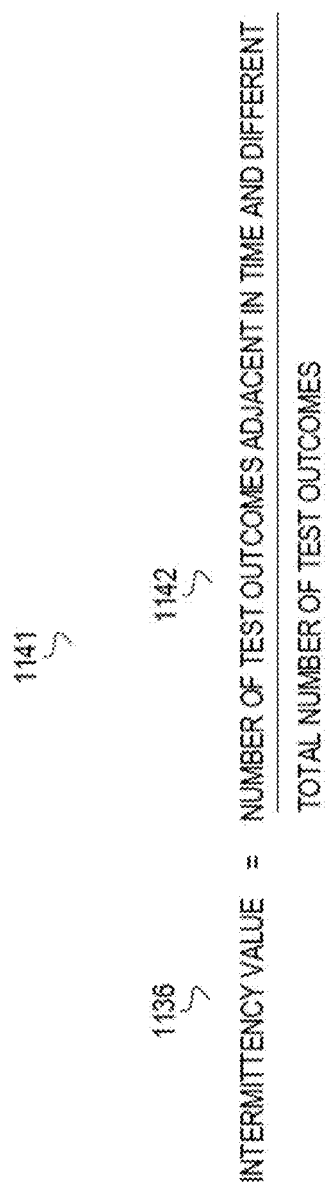
FIG. 9B is a block diagram of an intermittency metric 1141.

FIG. 9B is a block diagram illustrating an intermittency metric 1141. The intermittency metric 1141 is defined as an intermittency ratio for generating an intermittency value 1136. The intermittency ratio includes a numerator for counting test outcomes that are adjacent in time and different over a denominator for counting counts total test outcomes. To this end, the intermittency metric 1141 may be generated on a digital computer by utilizing a gap array and expressed as a percentage. For example, using the gap array [0, 0, 0, 0, 1, 0, 0, 0, 0], the numerator of the intermittency metric 1141 is the number gap elements in the gap array signifying a failure (e.g., "1") and the denominator of the intermittency metric 1141 is the number of gap elements in the gap array (e.g., "9"), the intermittency value 1136 being 1/9 in the present example.

Figure 9C:
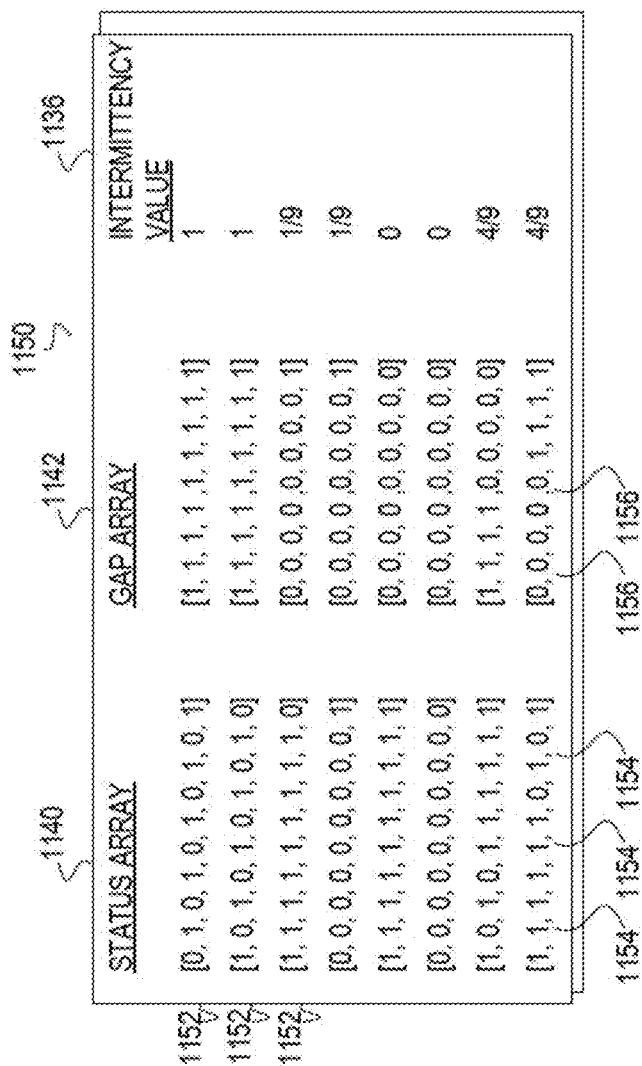
FIG. 9C is a block diagram illustrating example arrays, according to an example embodiment.

FIG. 9C is a block diagram illustrating example arrays 1150, according to an example embodiment. The example arrays 1150 include rows 1152. Each row 1152 includes a status array 1140, a gap array 1142, and an intermittency value 1136. In a single row, the gap array 1142 may be generated based on the corresponding (same row) status array 1140 and the intermittency value 1136 may be generated based on the corresponding (same row) gap array 1142. The status array 1140 includes status elements 1154. The gap array 1142 includes gap elements 1156. The gap array 1142 has one fewer elements than its corresponding status array 1140 because the gap elements 1156 in the gap array 1142 register status changes ("PASS," "FAIL") or ("FAIL," "PASS") in the corresponding status array 1140. In the present example, a value of "1" (e.g., asserted) may signify a test outcome with a "FAIL" status. The intermittency value 1136 is generated by dividing the number of asserted gap elements 1156 in the gap array 1142 by the number of gap elements 1156 in the gap array 1142. For example, an intermittency value 1136 of "1" may be generated by dividing the number of gap elements 1156 that are asserted (e.g., "9") by the total number of gap elements 1156 ("9") to yield 9/9. Also, for example, an intermittency value 1136 of "1/9" may be generated by dividing the number of gap elements 1156 that are asserted (e.g., "1") by the total number of gap elements 1156 ("9") to yield 1/9. Additional examples include intermittency values 1136 of 0/9 and 4/9. Further, it may be observed that the same intermittency value 1136 corresponds to different status arrays 1140 and different gap arrays 1142.

Measurement of Severity

Figure 9D:
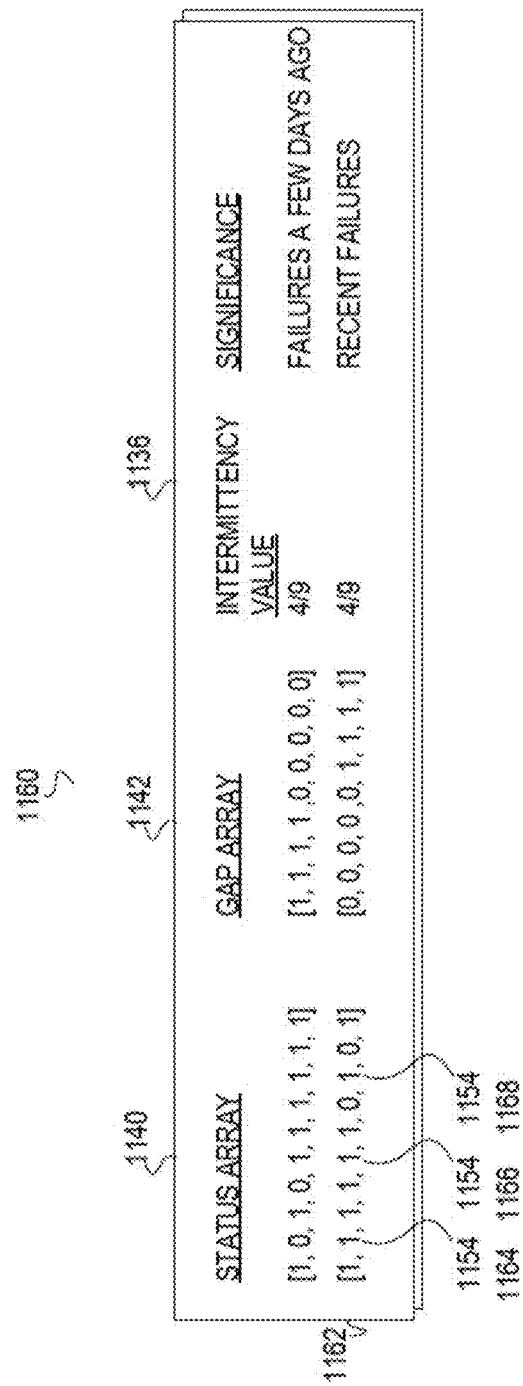
FIG. 9D is a block diagram illustrating example arrays, according to an example embodiment.

FIG. 9D is a block diagram illustrating example arrays 1160, according to an example embodiment. The example arrays 1160 correspond to the example arrays 1150 in FIG. 9C, accordingly, the same or similar references have been used to indicate the same or similar features unless otherwise indicated. The example arrays 1160 illustrate two status arrays 1140 registering test outcomes over a span of time. If for example, each status element 1154 in the status array 1140 at row 1162 corresponds to a test that is repeatedly applied over a span a time then a status element 1154, 1168 registers a test outcome ("1" or "PASS") that is later in time than a status element 1154, 1166 that, in turn, registers a test outcome ("1" or "PASS") that is later in time than a status element 1154, 1164 that, in turn, registers a test outcome ("1" or "PASS"). It may further be observed that the two rows of the status arrays 1140 illustrate the same intermittency value 1136 notwithstanding the row 1162 including the status array 1140 registering test outcomes as ("0" or "FAIL") occurring more recently in time. With respect to subject systems including software builds, the status array 1140 at row 1162 is highly significant because the test outcomes being registered as ("0" or "FAIL") occur closer to an approaching ship date. Accordingly, the example arrays 1160 illustrate, among other things, the intermittency metric 1141 as not quantifying test failures with respect to their sequence or occurrence in time.

Figure 9E:
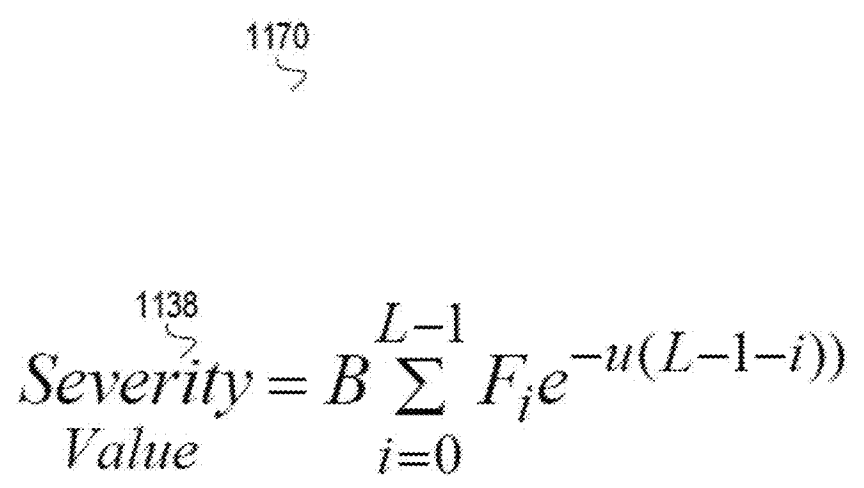

FIG. 9E is a block diagram illustrating a severity metric 1170. The severity metric 1170 is a formula for generating the severity value 1138. The severity metric 1170 quantifies test outcomes in sequence based on their occurrence in time. The values, functions and factors for the severity metric 1170 are described. The value "B" is a base severity value (e.g. MINOR=1. MAJOR=2, CRITICAL=3, etc.). The value "L" is the length of the status array 1140. The value "Fi" is the opposite of the status value at index "i" (e.g., status element 1154) of the status array 1140 (if status=0 then F=1). The value "u" is the attenuation factor. The severity value 1138 is the sum of the impact of the individual failures (status=0).

Figure 9F:
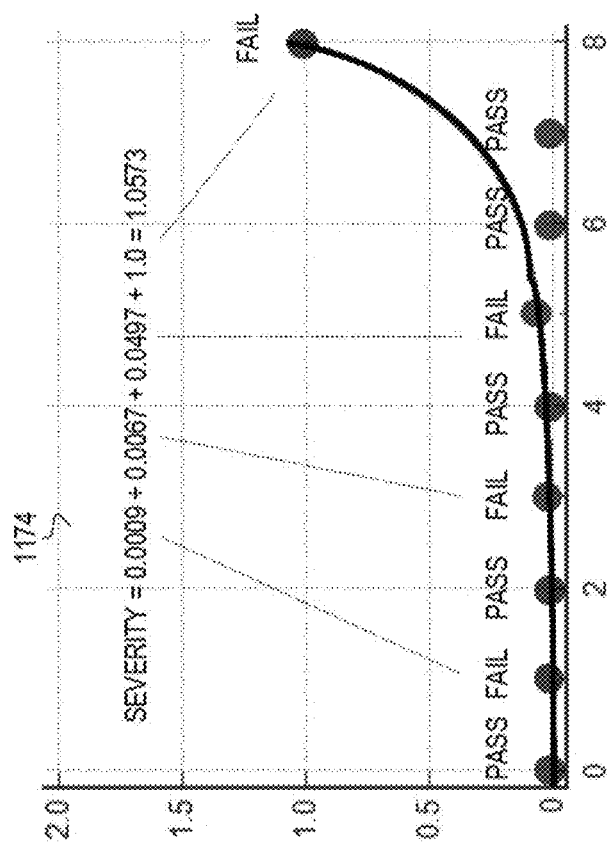
FIG. 9F is a block diagram illustrating a graph utilizing a severity metric to plot a set of test outcomes, according to an embodiment.

FIG. 9F is a block diagram illustrating a graph 1174 utilizing the severity metric 1170 to plot a set of test outcomes. The set of test outcomes includes four test outcomes with a "FAIL" status and five test outcomes with a "PASS" status. The graph 1174 illustrates the severity metric 1170 as yielding a "0" value on the "Y" axis for each of the test outcomes with a "PASS" status. The graph 1174 further illustrates the severity metric 1170 as yielding higher values on the "Y" axis for each succeeding test outcome with a "FAIL" status. For example, "Y" value increases (e.g., 0.0009, 0.00067, 0.0497, 1.0) as the "X" (e.g., index "i" in the severity metric 1170) value increase.

Figure 9G:
FIG. 9G is a block diagram illustrating example arrays, according to an example embodiment.

FIG. 9G is a block diagram illustrating example arrays 1176, according to an example embodiment. The example arrays 1176 include two status arrays 1140 illustrating increasing severity values 1138 though yielding the same intermittency value 1136 with an increasing value for "−u."

Figure 10A:
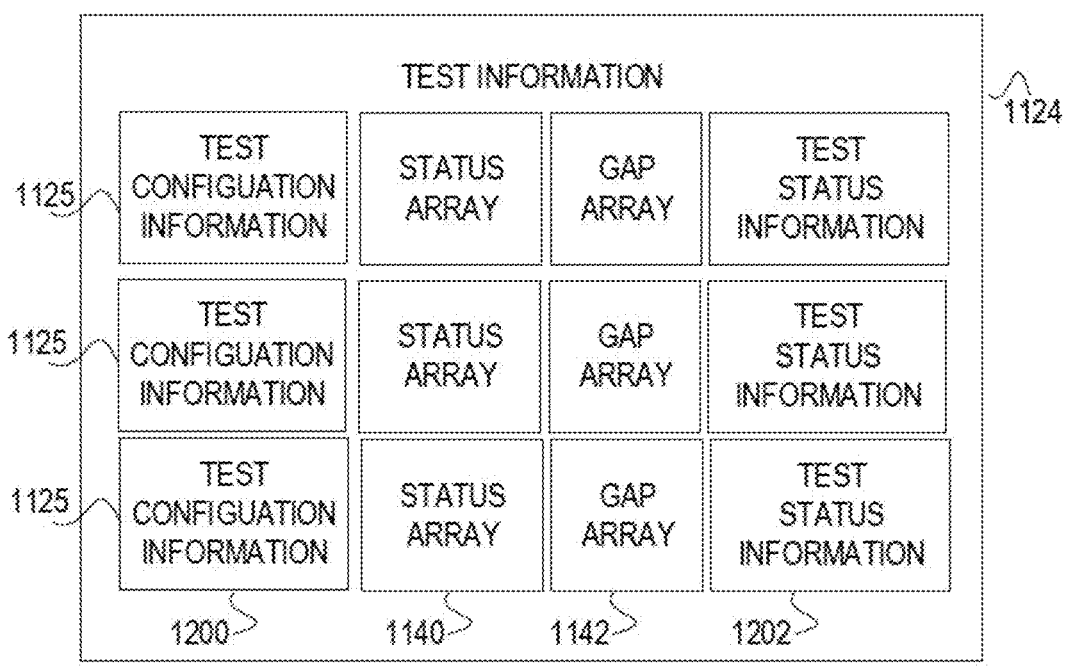
FIG. 10A is a block diagram illustrating test information, according to an example embodiment.

FIG. 10A is a block diagram illustrating test information 1124, according to an example embodiment. The test information 1124 may include one or more rows of test information 1124. Each row 1125 of the test information 1124 corresponds to a test. Each row of test information may include test configuration information 1200, the status array 1140 (as previously described), the gap array 1142, (as previously described), and test status information 1202.

Figure 10B:
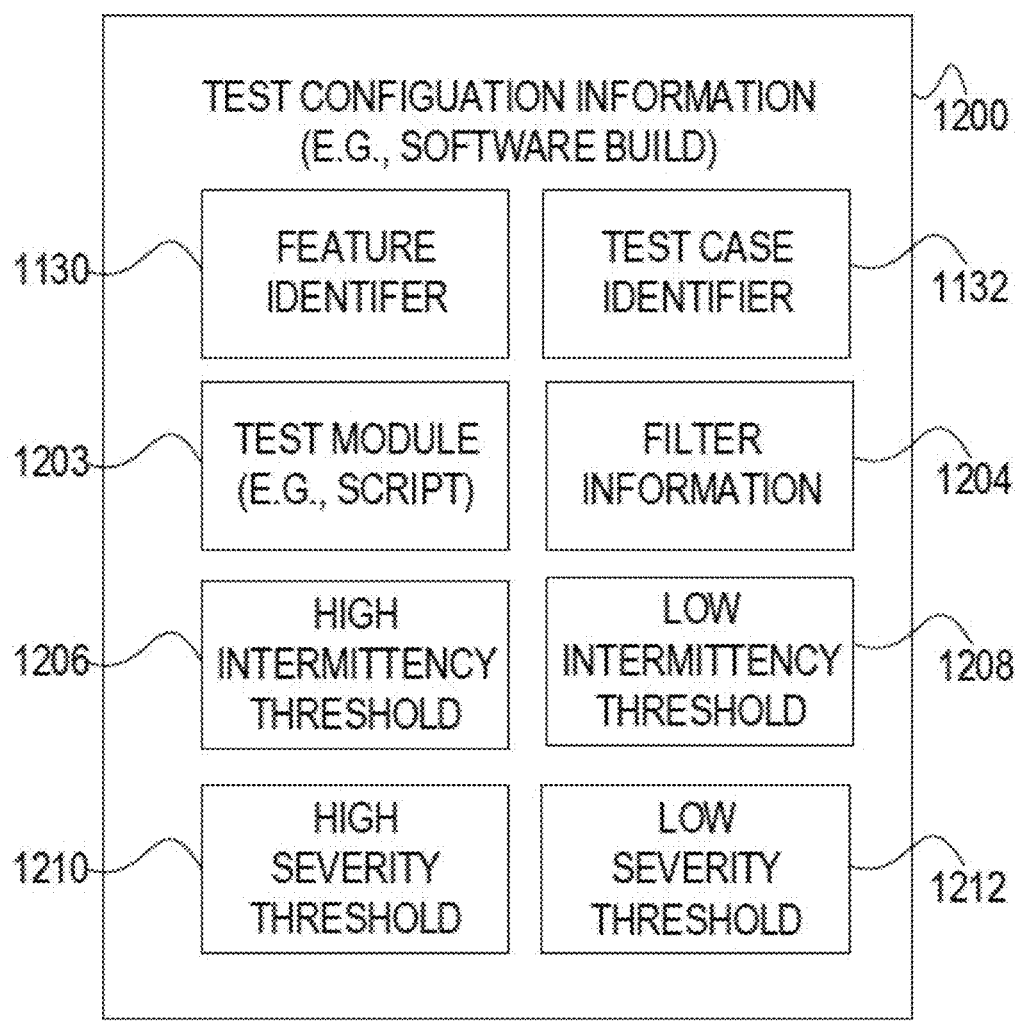
FIG. 10B is a block diagram illustrating test configuration information, according to an example embodiment.

FIG. 10B is a block diagram illustrating test configuration information 1200, according to an example embodiment. The test configuration information 1200 is stored for each row of test information 1124 and corresponds to a status array 1140, a gap array 1142, and test status information 1202. The test configuration information 1200 may be utilized to define a test and to store configurable parameters for the test.

The test configuration information 1200 may be utilized to define a test by storing the feature identifier 1130, the test case identifier 1132, and a test module 1203. The feature identifier 1130 may be utilized to uniquely identify a feature in the subject system 1104 that is being tested. For example, a software build system may include a user interface feature, a kernel feature, one or more application features, etc. that is being tested. The test case identifier 1132 may be used to uniquely identify a test case within the identified feature for testing. For example, the software build system may include multiple test cases for testing the user interface feature. The test module 1203 (e.g., object, module, application script, JavaScript or the like) may be loaded into the testing engine 1120 on the test machine 1106 and executed to apply the test to the subject system 1104. Each of the feature identifier 1130, the test case identifier 1132, and a test module 1203 in the test configuration information 1200 are configurable. For example, a user may utilize the client machine 1108 to load a new or updated test module 1203.

The test configuration information 1200 may be utilized to configure the test. To this end, the test configuration information may include filter information 1204, a high intermittency threshold 1206, a low intermittency threshold 1208, a high severity threshold 1210, and a low severity threshold 1212. The filter information 1204 may include one or more predetermined thresholds for filtering intermittency values 1136 and/or severity values 1138. The high intermittency threshold 1206, the low intermittency threshold 1208, the high severity threshold 1210, and the low severity threshold 1212 may be utilized to prioritize the intermittent failure values 1134 for the test.

Figure 10C:
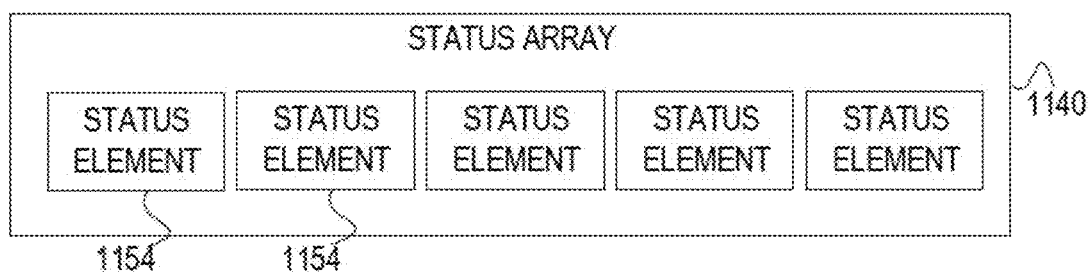
FIG. 10C is a block diagram illustrating a status array, according to an example embodiment.

FIG. 10C is a block diagram illustrating the status array 1140, according to an example embodiment. The status array 1140 may include one or more status elements 1154, as previously described. Each status element 1154 may be utilized to store a binary outcome. For example, the status element 1154 may be registered as asserted ("1") or registered as not asserted ("0"). In one embodiment, the status element 1154 may be asserted ("1") to register a test outcome of "PASS." For example, in testing a software build the status element 1154 may be asserted "1" to store a single test outcome of "PASS" for a test case.

Figure 10D:
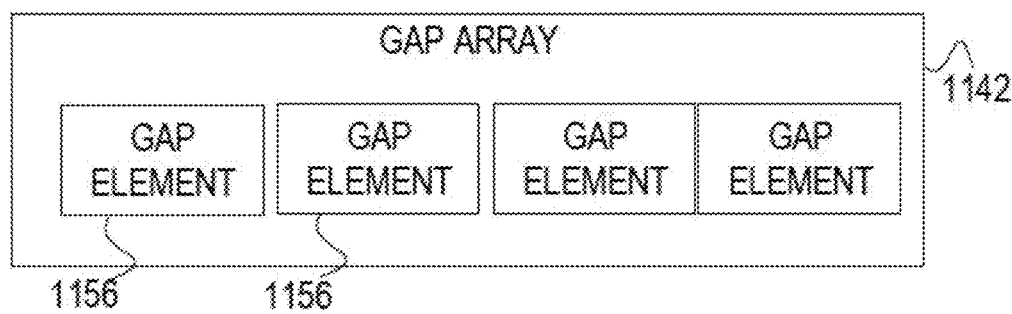
FIG. 10D is a block diagram illustrating a gap array, according to an example embodiment.

FIG. 10D is a block diagram illustrating the gap array 1142, according to an example embodiment. The gap array 1142 may include one or more gap elements 1156, as previously described. The gap array 1142 may be utilized to describe a status array 1140. For example, contiguous status elements 1154 in the status array 1140 with different values may be registered asserted ("1") in the corresponding gap array 1142, according to an embodiment. Accordingly, the number of gap elements 1156 in a gap array 1142 is one less than the number of status elements 1154 in the corresponding status array 1140.

Figure 10E:
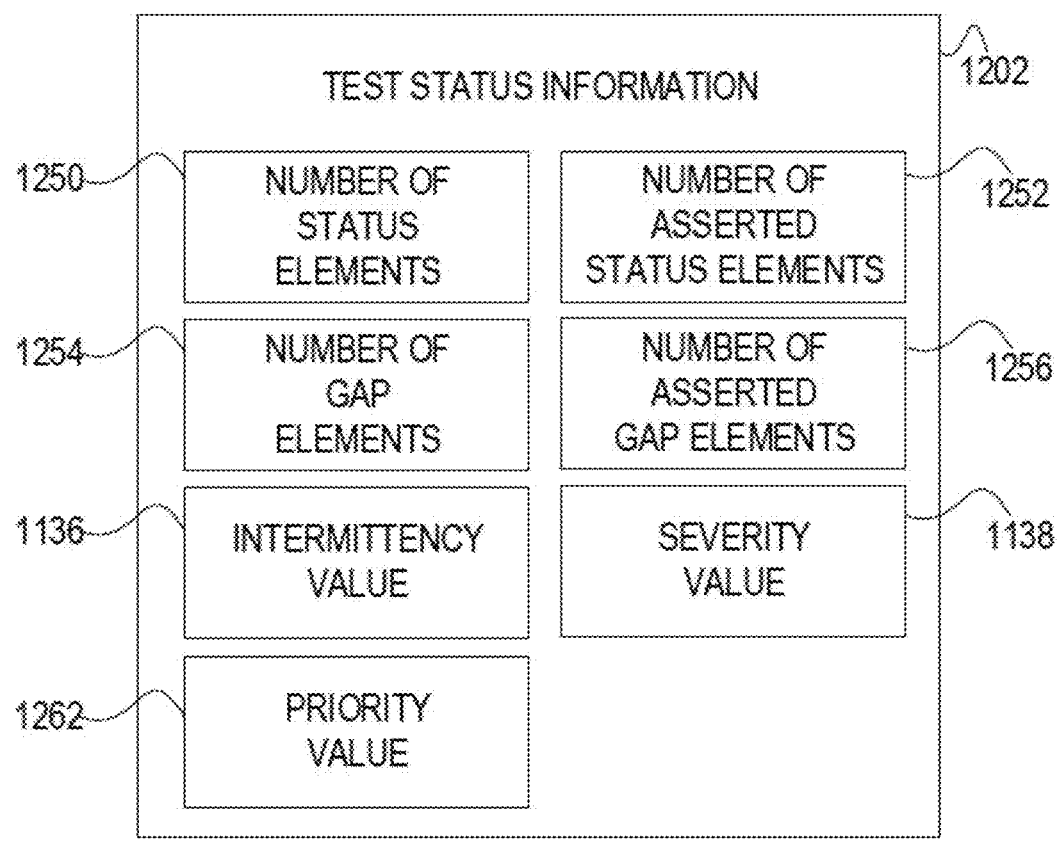
FIG. 10E is a block diagram illustrating test status information, according to an example embodiment.

FIG. 10E is a block diagram illustrating the test status information 1202, according to an example embodiment. The test status information 1202 is included in each row of the test information 1124, as previously described. The test status information 1202 may store a number of status elements 1250, a number of asserted status elements 1252, a number of gap elements 1254, a number of asserted gap elements 1256, an intermittency value 1136, a severity value 1138, and a priority value 1262. The number of status elements 1250 is a count of the number of status elements 1154 in the corresponding status array 1140 in the row of the test information 1124. The number of asserted status elements 1252 is a count of the number of status elements 1154 in the corresponding status array 1140 in the row of the test information 1124 that are asserted ("1"). The number of number of gap elements 1254 is a count of the number of gap elements 1156 in the corresponding gap array 1142 in the row of the test information 1124. The number of asserted gap elements 1256 is a count of the number of gap elements 1156 in the corresponding gap array 1142 in the row of the test information 1124 that are asserted ("1"). The intermittency value 1136, the severity value 1138, and the priority value 1262 are respectively computed and stored based on the corresponding status array 1140 and gap array 1142 in the row of the test information 1124.

Figure 10F:
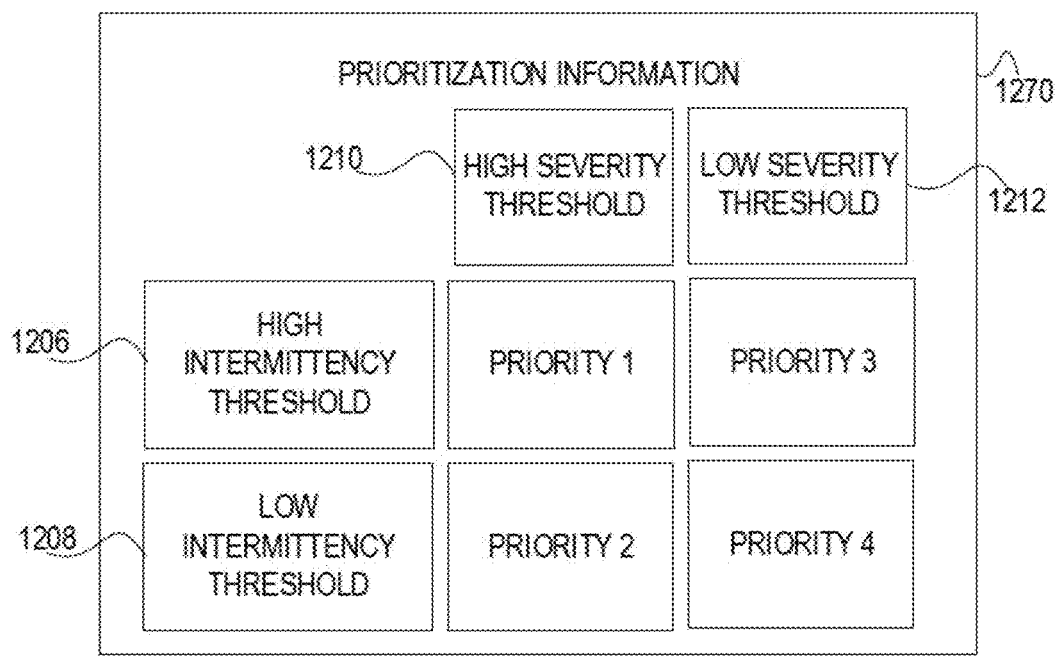
FIG. 10F is a block diagram illustrating prioritization information, according to an example embodiment.

FIG. 10F is a block diagram illustrating prioritization information 1270, according to an example embodiment. The prioritization information 1270 may be used to compute the priority value 1262, as shown in FIG. 10E. The priority value 1262 may be "PRIORITY 1," "PRIORITY 2," "PRIORITY 3," or "PRIORITY 4," according to an embodiment. For example, a row of test information 1124 including test status information 1202, as shown in FIG. 10A, may include an intermittency value 1136 greater or equal to the high intermittency threshold 1206 and a severity value 1138 greater or equal to the high severity threshold 1210 to yield "PRIORITY 1." Further for example, the row of test status information 1202 may include an intermittency value 1136 greater or equal to the low intermittency threshold 1208 but less than the high severity threshold 1210 and a severity value 1138 greater or equal to the high severity threshold 1210 to yield "PRIORITY 2." Further for example, the row of test status information 1202 may include an intermittency value 1136 greater or equal to the high intermittency threshold 1206 and a severity value 1138 greater or equal to the low severity threshold 1212 but less than the high severity threshold 1210 to yield "PRIORITY 3." Further for example, the row of test status information 1202 may include an intermittency value 1136 greater or equal to the low intermittency threshold 1208 but less than the high intermittency threshold 1206 and a severity value 1138 greater or equal to the low severity threshold 1212 but less than the high severity threshold 1210 to yield "PRIORITY 4." The priority value 1262 may be utilized to schedule a resource. For example, the priority value 1262 may be used to schedule an engineering resource, according to an embodiment.

Figure 11A:
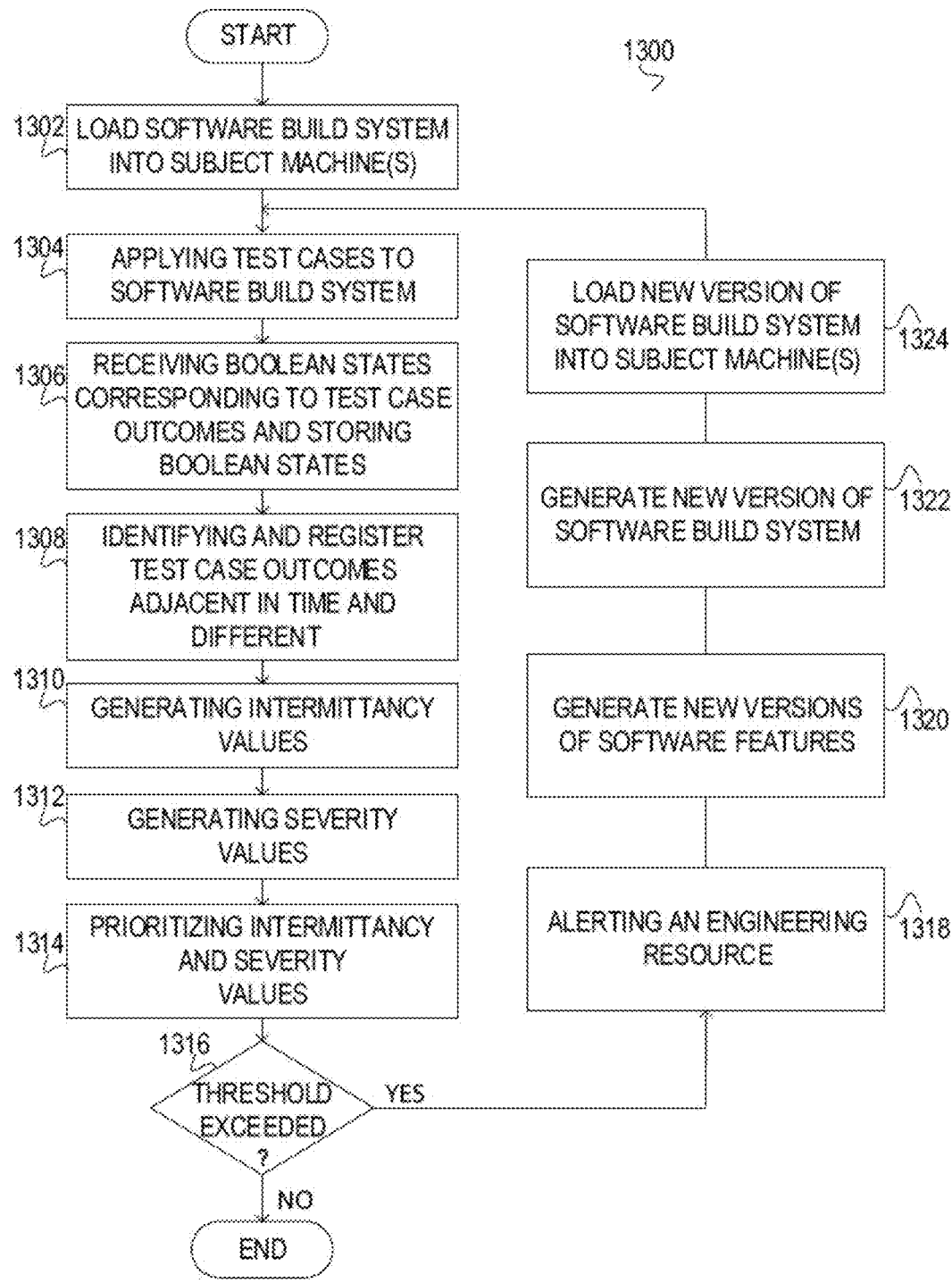
FIG. 11A is a block diagram illustrating a method, according to an example embodiment, that is improved for testing a subject system with a software testing process utilizing one or more digital computers.

FIG. 11A is a block diagram illustrating a method 1300, according to an example embodiment that is improved and for testing a subject system with a software testing process utilizing one or more digital computers. The method 1300 commences, at the test machine 1106 and operation 1302, with the testing engine 1120 loading a subject system 1104 into the subject machine 1102. For example, the testing engine 1120 may load a software build system (e.g., version one) into the subject machine 1102.

At operation 1304 and the test machine 1106, the testing engine 1120 may apply multiple tests to the subject system 1104 (e.g., software build system). For example, the testing engine 1120 may access each row of the test information 1124 to retrieve and execute a test module 1203 (e.g., script) that, in turn, test different features/test cases of the subject system 1104 (e.g., software build system). The testing engine 1120 may save the results of each test as a Boolean state (e.g., PASS=1, FAIL=0). The testing engine 1120 may continue testing the subject system 1104 by iterating through the test information 1124 until all rows of the test information 1124 are exhausted. The operation 1304 is described in more detail with method 1340 in FIG. 11B.

Returning to FIG. 11A, at operation 1306, the receiving module 1123 may receive the Boolean states from the testing engine 1120 and store the Boolean states. For example, the receiving module 1123 may receive a set of Boolean states for each feature identifier 1130/test case identifier 1132 (row) of the test information 1124 and store the Boolean states in the status array 1140 of the corresponding row of the test information 1124.

At operation 1308, the processing module 1126 may identify and register test case outcomes that are adjacent in time and different. Recall that each row of the test information 1124 corresponds to a feature/test case and includes a status array 1140, a gap array 1142, and test status information 1202. The processing module 1126 may process each row of the test information 1124 by registering an assertion (e.g., "1") in gap elements 1156 of the gap array 1142 responsive to identifying adjacent status elements 1154 in the corresponding status array 1140 as being different (e.g., "PASS" "FAIL" or "FAIL" "PASS"). The processing module 1126 may continue to process each row of the test information 1124 until the test information 1124 is exhausted. The operation 1308 is described in more detail with method 1360 in FIG. 11C.

Returning to FIG. 11A, at operation 1310, the processing module 1126 may generate an intermittency value 1136 by utilizing the intermittency metric 1141, as shown in FIG. 9B. For example, the processing module 1126 may divide the number of asserted gap elements 1156 in the gap array 1142 by the number of gap elements 1156 in the gap array 1142. The number of gap elements is one less than the number of status elements 1250 utilized to register test outcomes. Returning to FIG. 11A, the processing module 1126 may generate an intermittency value 1136 for each row of the test information 1124 and store the intermittency value 1136 that was generated in the corresponding row of the test status information 1202.

At operation 1312, the processing module 1126 may generate a severity value 1138 but utilizing the severity metric 1170, as shown in FIG. 9E. Recall the severity metric 1170 quantifies test outcomes based on their sequence. For example, the value "B" may be selected CRITICAL from a plurality of candidate "B" values (e.g. MINOR=1. MAJOR=2, CRITICAL=3, etc.). The value "L" is the length of the status array 1140 for the row of the test information 1124 being processed by the processing module 1126. The length of the status array 1142 is the number of status elements 1154 utilized to register test outcomes. The value "Fi" is the opposite of the status value at index "i" of the status array 1140 (e.g., if status=0 then F=1). The severity value 1138 is the sum of the impact of the individual failures (status=0). Returning to FIG. 11A, the processing module 1126 may generate a severity value 1138 for each row of the test information 1124 and store the severity value 1138 in the corresponding row of the test information 1124.

At operation 1314, the processing module 1126 may prioritize the intermittency value 1136 and severity value 1138. For example, the processing module 1126 may prioritize the intermittency value 1136 and severity value 1138 that is stored in each row of the test information 1124. The processing module 1126 may prioritize the intermittency value 1136 and severity value 1138 by generating a priority value 1262 and storing the priority value (e.g., PRIORITY 1, PRIORITY 2, PRIORITY 3, or PRIORITY 4) in the test status information 1202 for each row of the test information 1124. For example, the processing module 1126 may prioritize the intermittency value 1136 and severity value 1138 for a row of test information 1124 by utilizing the high severity threshold 1210, the low severity threshold 1212, the high intermittency threshold 1206, and the low intermittency threshold 1208 in the row of test information 1124, as described in association with the prioritization information 1270 illustrated in FIG. 10F. The operation 1314 is described in more detail with method 1380 in FIG. 11D.

Returning to FIG. 11A, at decision operation 1316, the processing module 1126 may determine whether a threshold is exceeded. For example, the processing module 1126 may determine whether any of the tests in the test status information 1202 have a priority value 1262 that exceeds a predetermined threshold. For example, if the priority value 1262 for any of the tests in the test status information 1202 have a priority value 1262 above the predetermined threshold of "PRIORITY 3" (e.g., "PRIORITY 1" or "PRIORITY 2") then the processing module 1126 branches to operation 1318. Otherwise, the processing module 1126 ends.

At operation 1318, the processing module 1126 may alert an engineering resource. For example, the processing module 1126 may alert an engineering resource by communicating, over a network, an electronic message (e.g., alert message) to one or more software engineers. The network may include an internal network (e.g., local area network) and/or an external network (e.g., Internet) and the communication may be over any type of wired (e.g., plain old telephone service (POTS)) or wireless (e.g., Bluetooth, radio frequency identification (RFID), etc.) protocol. In addition, the processing module 1126 may cause the electronic message to be routed over the network to at least one of a first engineering resource (e.g., database engineering resource) and a second engineering resource (e.g., search application engineering resource). The electronic message may include multiple operations that may be electronically read and causing an electronic response. For example, the first operation may request a scheduling of the engineering resource and a second operation may be an assigning of a task to the engineering resource. With respect to the scheduling the engineering resource the first operation may include a sub-operation "A" requesting an identification of an availability of a period time in an electronic calendar (e.g., Outlook) associated with the engineering resource and a sub-operation "B" requesting an allocation of the period of time identified in sub-operation "A." With respect to the assigning of the task to the engineering resource, the second operation may task the one or more engineers to attend to intermittent failure values 1134 associated with a first software feature being tested with the test module 1203 (e.g., script) associated with an identified feature identifier 1130 and test case identifier 1132. In some instances, the one or more software engineers may resolve the alert by focusing on applying a repair to the test module 1203 (e.g., script). In other instances, the one or more software engineers may resolve the alert by focusing on applying a repair to software instructions of the subject system 1104 (software build system). For example, the one or more engineers may focus on editing the software instructions of the source code associated with the identified feature identifier 1130 and test case identifier 1132 (e.g., product).

At operation 1320, the engineering resource may generate a new version of the software instructions being tested by the test module 1203 associated with the feature identifier 1130 and test case identifier 1132 (e.g., product) to include the repair to the appropriate software instructions. For example, the one or more engineers may edit software instructions including the repair in source code and compile the source code to generate one or more software objects collectively designated as a new version of the first software feature (e.g., version two). At operation 1322, the engineering resource may further generate a new version of the software build system (e.g., version two) including the new version of the first software feature (e.g., version two) including the recently generated one or more software objects including the repair.

At operation 1324, the testing engine 1120 may load the subject system 1104 into the subject machine 1102. The subject system 1104 includes the new version of the software build system (e.g., version two) that, in turn, includes the new version of the first software feature (e.g., version two) including the repair and the method 1300 reiterates.

Figure 11B:
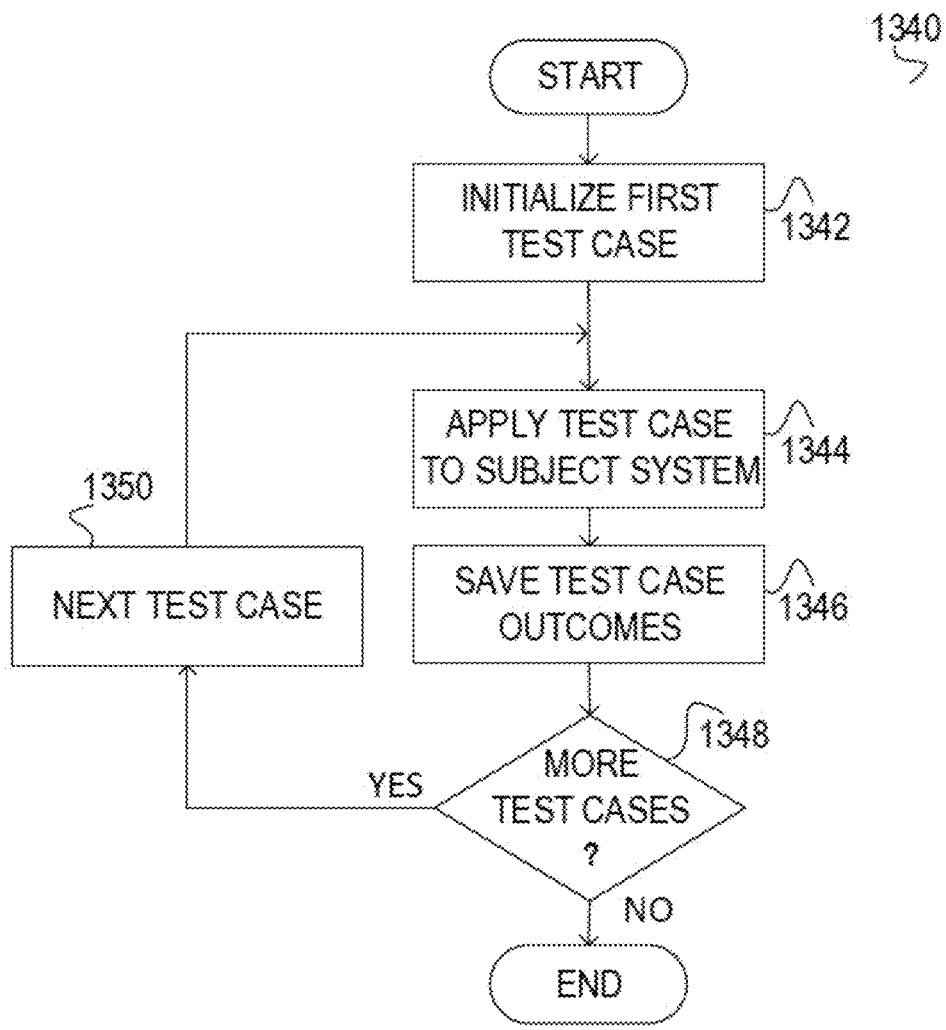
FIG. 11B is a block diagram illustrating a method for applying a plurality of test cases to a subject system, according to an example embodiment.

FIG. 11B is a block diagram illustrating a method 1340 for applying a plurality of test cases to a subject system, according to an example embodiment. The method 1340 further describes operation 1304, FIG. 11A. Returning to FIG. 11B, at operation 1342, the processing module 1126 initializes the first test case. For example, the processing module 1126 may load the test module 1203 from the test configuration information 1200 of the first row of the test information 1124 into the testing engine 1120 in the test machine 1106.

At operation 1344, the testing engine 1120 is utilized to execute the test module 1203 that, in turn, applies a test case to the subject system 1104. For example, the test module 1203 may include a script that inputs predetermined values into one or more input mechanisms being presented by a software build system with a first user interface. Further for example, the test module 1203 (e.g., script) may communicate the predetermined values to the software build system by submitting the first user interface over a network link to the software build system and wait a predetermined amount of time for the software build system to communicate back a second user interface. Further for example, the test module 1203 (e.g., script) may parse the second user interface to determine whether the second user interface includes one or more expected outputs. If the test module 1203 (e.g., script) identifies the expected outputs are received then the test module 1203 (e.g., script) returns a test outcome of "PASS." Otherwise, the test module 1203 returns a test outcome of "FAIL."

Also for example, the test module 1203 (e.g., script) may communicate predetermined input values for testing the search screen 800 of the event-based data intake and query system, SPLUNK® ENTERPRISE system developed by Splunk Inc. of San Francisco, Calif., as illustrated in FIG. 8A. For example, the test module 1203 may communicate predetermine input values including a search string (e.g., "buttercupgames") for submission into the search bar 802 and a time range of "today" for submission into the "time range picker" 812. Further, the test module 1203 may execute the search by providing a carriage return and by waiting a predetermined period (e.g., 100 milliseconds) before parsing the search screen 800 being generated and displayed by the subject system 1104 (e.g., SPLUNK® ENTERPRISE system). For example, the test module 1203 may parse the events tab from the search screen 800 to receive an event number generated with the response (e.g., 36,819) and compare the parsed value with the expected value. If the parsed value does not equal the expected value then the test module 1203 may register the test outcome as "FAIL" or "0." Also for example, the test module 1203 may parse the events list 808 and compare the parsed events with the expected events. If the parsed events do not equal the expected events the test module 1203 may register the test outcome as "FAIL" or "0." Other tests may be performed on the SPLUNK® ENTERPRISE system.

At operation 1346, the test module 1203 (e.g., script) saves the test outcome in association with the feature identifier 1130 and the test case identifier 1132.

At decision operation 1348, the test module 1203 (e.g., script) identifies whether more rows (e.g., test cases) remain in the test information 1124. If the test module 1203 identifies more test cases are in the test information 1124 then the test module 1203 branches to operation 1350. Otherwise, the test module 1203 ends.

At operation 1350, the test module 1203 increments to the next test case. For example, the test module 1203 may advance to the next row in the test information 1124 and load the test module 1203 (e.g., script) out of the test configuration information 1200 and into the testing engine 1120.

Figure 11C:
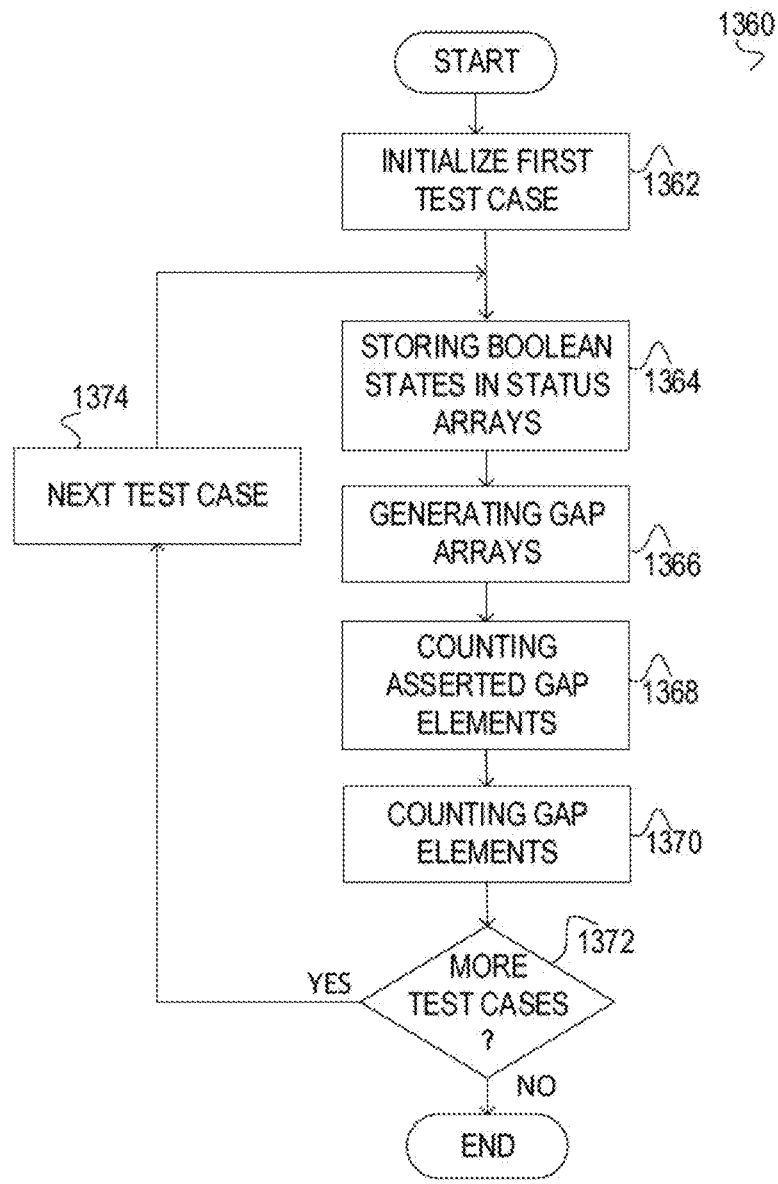
FIG. 11C is a block diagram illustrating a method for identifying test case outcomes, according to an example embodiment.

FIG. 11C is a block diagram illustrating a method 1360 for identifying test case outcomes, according to an example embodiment. The processing module 1126 identifies one or more test case outcomes for each test in the test information 1124. For example, the method 1360 may commence with the processing module 1126 advancing to the first row 1125 (e.g., test) of the test information 1124 by setting a row 1125 counter to "0." Recall that each row of the test information 1124 corresponds to a feature/test case and includes a status array 1140, a gap array 1142, and test status information 1202.

At operation 1364 the processing module 1126 may receive the Boolean states for the current row 1125 (e.g., test) from the testing engine 1120 and store the Boolean states in the status array 1140 for the row 1125 (e.g., test). Each Boolean state registers "PASS" or "FAIL" for a test performed by the testing engine 1120. Further, the processing module 1126 may receive and store a count of the number of test performed from the testing engine 1120. For example, the processing module 1126 may receive a count of the number of tests performed from the testing engine 1120 and store the count as the of number of status elements 1250 in the test status information 1202 for the row 1125 (e.g., test).

At operation 1366 the processing module 1126 may generate a gap array 1142 for the row 1125 (e.g., test). The processing module 1126 may register an assertion (e.g., "1") in each gap element 1156 of the gap array 1142 responsive to identifying adjacent status elements 1154 in the status array 1140 for the row 1125 (e.g., test) as being different (e.g., "PASS" "FAIL" or "FAIL" "PASS").

At operation 1368 the processing module 1126 may count the number of gap elements 1156 for the row 1125 (e.g., test) that are asserted. For example, the processing module 1126 may count gap elements 1156 in the gap array 1142 that are asserted and store the count as the number of asserted gap elements 1256 in the row 1125 of the test information 1124.

At operation 1370 the processing module 1126 may count the gap elements 1156 for the row 1125 (e.g., test). For example, the processing module 1126 may subtract one from the number of status elements 1250 in the current row 1125 of the test information 1124 to generate a count of gap elements 1156 that, in turn, the processing module 1126 stores as the number of gap elements 1254 in the row 1125 of the test information 1124.

At decision operation 1372, the processing module 1126 may identify whether more rows (e.g., tests) remain in the test information 1124. If the processing module 1126 identifies more rows 1125 (e.g., tests) are in the test information 1124 then the processing module 1126 branches to operation 1374. Otherwise, the processing module 1126 ends.

At operation 1374, the processing module 1126 may advance to the next test row (e.g., test). For example, the processing module 1126 may advance to the next row in the test information 1124 by incrementing a row 1125 counter.

Figure 11D:
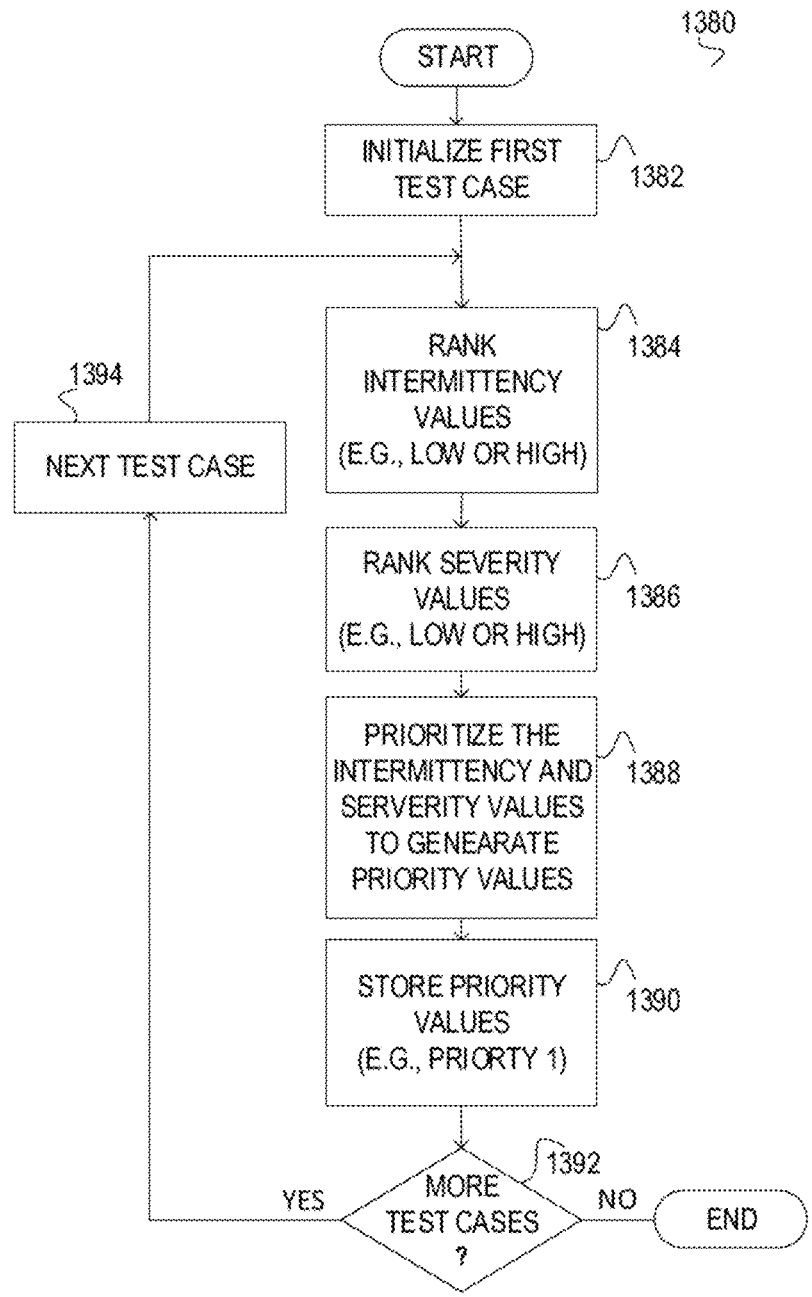
FIG. 11D is a block diagram illustrating a method for prioritizing intermittency and severity values, according to an example embodiment.

FIG. 11D is a block diagram illustrating a method 1380, according to an embodiment, for prioritizing intermittency values 1136 and severity values 1138. The method 1380 commences at operation 1382 with the processing module 1126 advancing to the first row 1125 (e.g., test) of the test information 1124. For example, the method 1360 may commence with the processing module 1126 setting a row 1125 counter to "0."

At operation 1384, the processing module 1126 may rank the intermittency value 1136 for the row 1125 as "LOW PRIORITY" or "HIGH PRIORITY." The processing module 1126 may rank the intermittency value 1136 based on the high intermittency threshold 1206 and the low intermittency threshold 1208, in accordance with the operations described in FIG. 10F. In addition, the processing module 1126 may store the intermittency value 1136 in the row of the test information 1124.

At operation 1384, the processing module 1126 may rank intermittency value 1136 for the row 1125 (e.g., test). For example, the processing module 1126 may rank the intermittency value 1136 as "LOW PRIORITY" or "HIGH PRIORITY" based on the high intermittency threshold 1206 and the low intermittency threshold 1208 in accordance with the operations described in FIG. 10F.

At operation 1386, the processing module 1126 may rank the severity value 1138 for the row 1125 (e.g., test). For example, the processing module 1126 may rank the severity value 1138 as "LOW PRIORITY" or "HIGH PRIORITY" based on the high severity threshold 1210 and the low severity threshold 1212 in accordance with the operations described in FIG. 10F.

At operation 1388, the processing module 1126 may prioritize the intermittency value 1136 and the severity value 1138 for the row 1125 (e.g., test). The processing module may prioritize the intermittency value 1136 and the severity value 1138 based on the ranking of the intermittency value 1136 and the ranking of the severity value 1138. For example, the processing module 1126 may generate a priority value 1262 (e.g., "PRIORITY 1," "PRIORITY 2," "PRIORITY 3," or "PRIORITY 4") in accordance with the operations described in FIG. 10F.

At operation 1390, the processing module 1126 may store the priority value 1262 in the priority value 1262 for the row 1125 (e.g., test) in the test information 1124. At decision operation 1392, the processing module 1126 may identify whether more rows (e.g., tests) remain in the test information 1124. If the processing module 1126 identifies more rows 1125 (e.g., tests) are in the test information 1124 then the processing module 1126 branches to operation 384. Otherwise, the processing module 1126 ends.

At operation 1394, the processing module 1126 may advance to the next test row (e.g., test). For example, the processing module 1126 may advance to the next row 1125 (e.g., test) in the test information 1124 by incrementing the row 1125 counter.

Figure 12A:
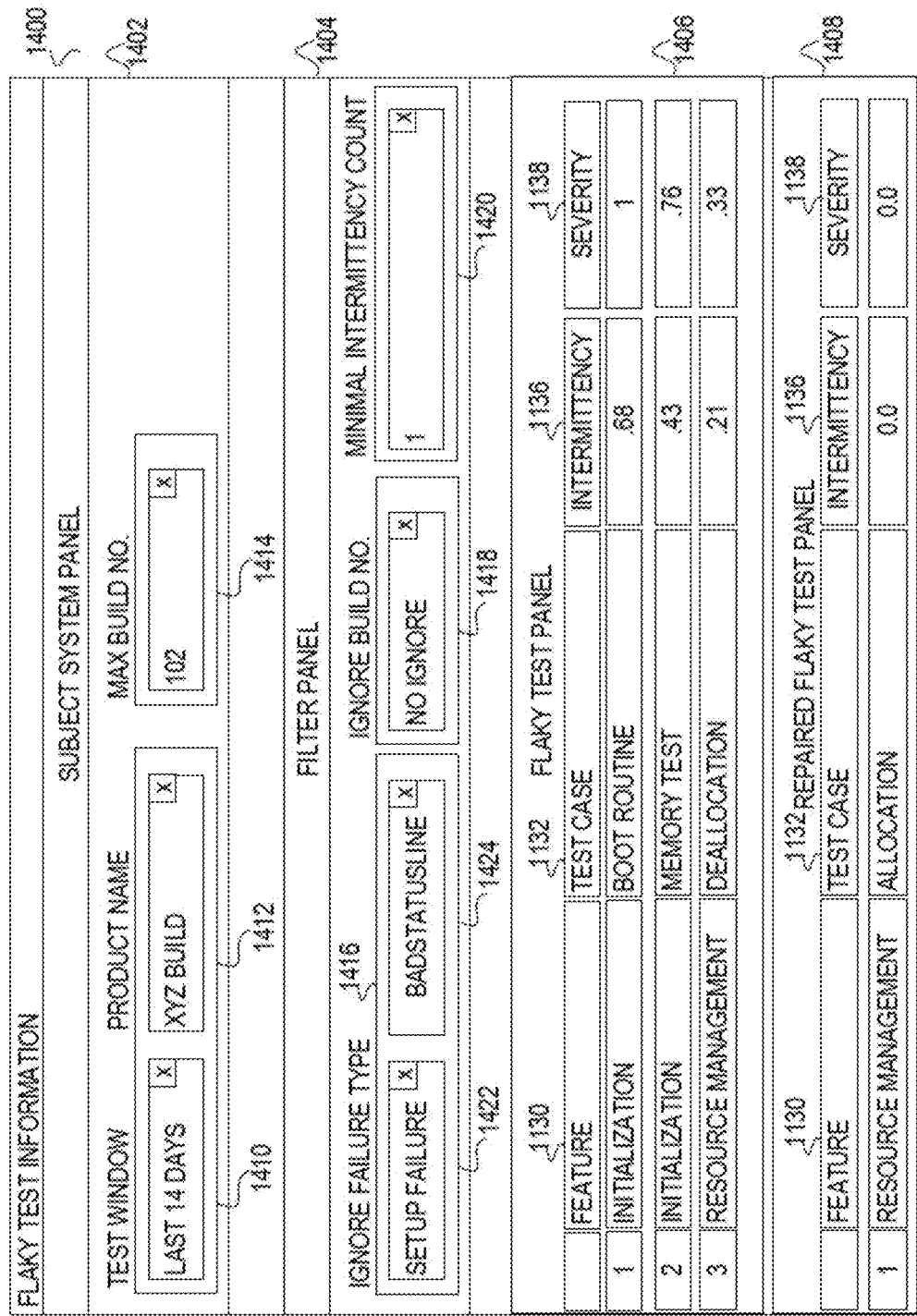
FIGS. 12A-12B are block diagrams illustrating user interfaces, according to an example embodiment.

FIG. 12A is a diagram illustrating a user interface 1400, according to an example embodiment, for displaying flaky test information. The user interface 1400 may be utilized to configure the system 1100, as shown in FIG. 9. Returning to FIG. 12A, the user interface 1400 may include a subject system panel 1402, a filter panel 1404, a flaky test panel 1406, a repaired flaky test panel 1408. The subject system panel 1402 may include a test window 1410, a product name 1412, and a maximum build number 1414. The test window 1410 may be utilized to configure a span of time for determining intermittent failure values 1134. For example, the test window 1410 is illustrated as being configured to cover a span of time of fourteen days. Accordingly, the test machine 1106, as shown in FIG. 9, may utilize the software builds that were submitted for testing in the last fourteen days for determining intermittent failure values 1134. The product name 1412 may be configured to associated different software build systems that are being tested with a configured test window 1410 and maximum build number 1414. The maximum build number 1414 may be utilized to filter software builds with numbers greater than the configured value. The filter panel 1404 may be utilized to configure filters. The filter panel 1404 may include a failure type filter 1416, a build number filter 1418, and a minimal intermittency counter 1420. The failure type filter 1416 may include a first failure type 1422 and a second failure type 1424. The failure type filter 1416 may be configured to filter the specified failure types in determining intermittent failure values 1134. The build number filter 1418 may be configured to ignore tests associated with the configured build number in determining intermittent failure values 1134. The minimal intermittency count 1420 may be configured to establish a threshold minimum number of asserted ("1") gap elements in the gap array 1142 that must be counted to register an intermittency failure. The flaky test panel 1406 illustrate tests identified as flaky for the specified test window 1410. Each row of the flaky test panel 1406 may include the feature identifier 1130, the test case identifier 1132, the intermittency value 1136, and the severity value 1138, all as previously described. Accordingly, the flaky test panel 1406 may illustrate tests requiring an alerting of engineering resources for the application of a repair. The repaired flaky test panel 1408 illustrates tests previously identified as flaky but now identified as not flaky for the specified test window 1410. For example, an engineering resource have been dispatched and have submitted repairs. Also, for example, an engineering resource may not have been dispatched but the flaky test no longer exhibits an intermittency value 1136 or a severity value 1138 for the specified test window 1410 above a pathological threshold. Each row of the repaired flaky test panel 1408 may include the feature identifier 1130, the test case identifier, the intermittency value 1136, and severity value 1138, all as previously described. Each row of the flaky test panel 1406 or the repaired flaky test panel 1408 may be selected to display a flaky test detailed report.

Figure 12B:
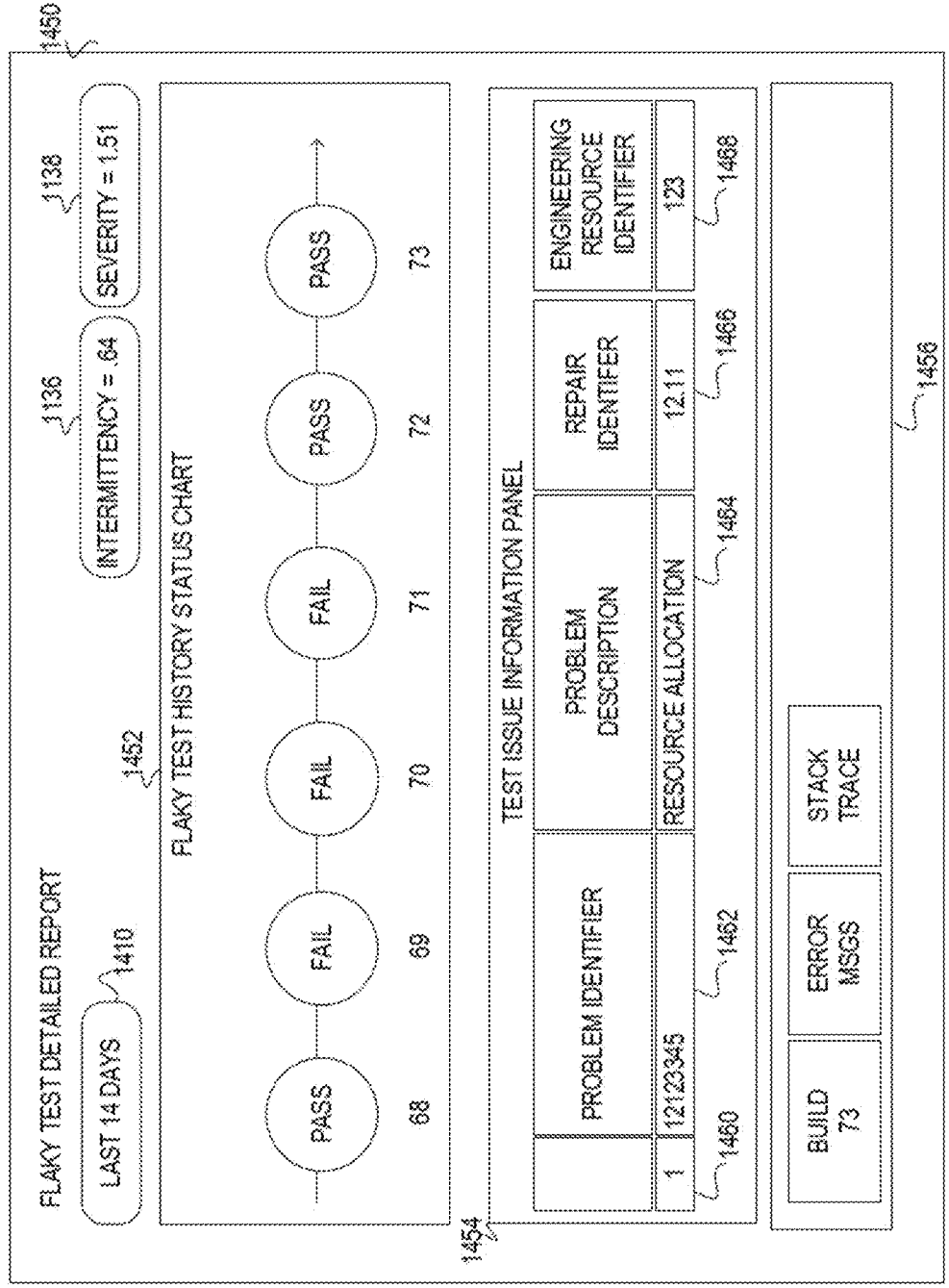

FIG. 12B is a diagram illustrating a user interface 1450, according to an example embodiment, for displaying a flaky test detailed report. The user interface 1450 may be displayed responsive to selecting a row of the flaky test panel 1406 or the repaired flaky test panel 1408, as shown in FIG. 12A. Returning to FIG. 12B, the user interface 1450 may include the test window 1410, the intermittency value 1136 and the severity value 1138 for the selected flaky test. The user interface 1450 may further include a flaky test history status chart 1452, a test issue information panel 1454, and error information 1456 for the selected flaky test. The flaky test history status chart 1452 illustrates the outcomes of the most recent tests performed in association with their builds for the selected flaky test. The test issue information panel 1454 may include a row number 1460, a problem identifier 1462, a problem description 1464, a repair identifier 1466 and an engineering resource identifier 1468 for the selected flaky test. The problem identifier 1462 uniquely identifies the problem that was assigned to an engineering resource in association with the selected flaky test. The problem description 1464 provides a brief description of the problem. The repair identifier 1466 uniquely identifies a repair applied to a software build system that is tested with the selected flaky test. The engineering resource identifier 1468 uniquely identifies an engineering resource (e.g., engineer, lab, equipment, etc.) that is assigned to the problem. The error information 1456 may include the build number, error messages and stack trace for the most recent failure associated with the selected flaky test.

Figure 13A:
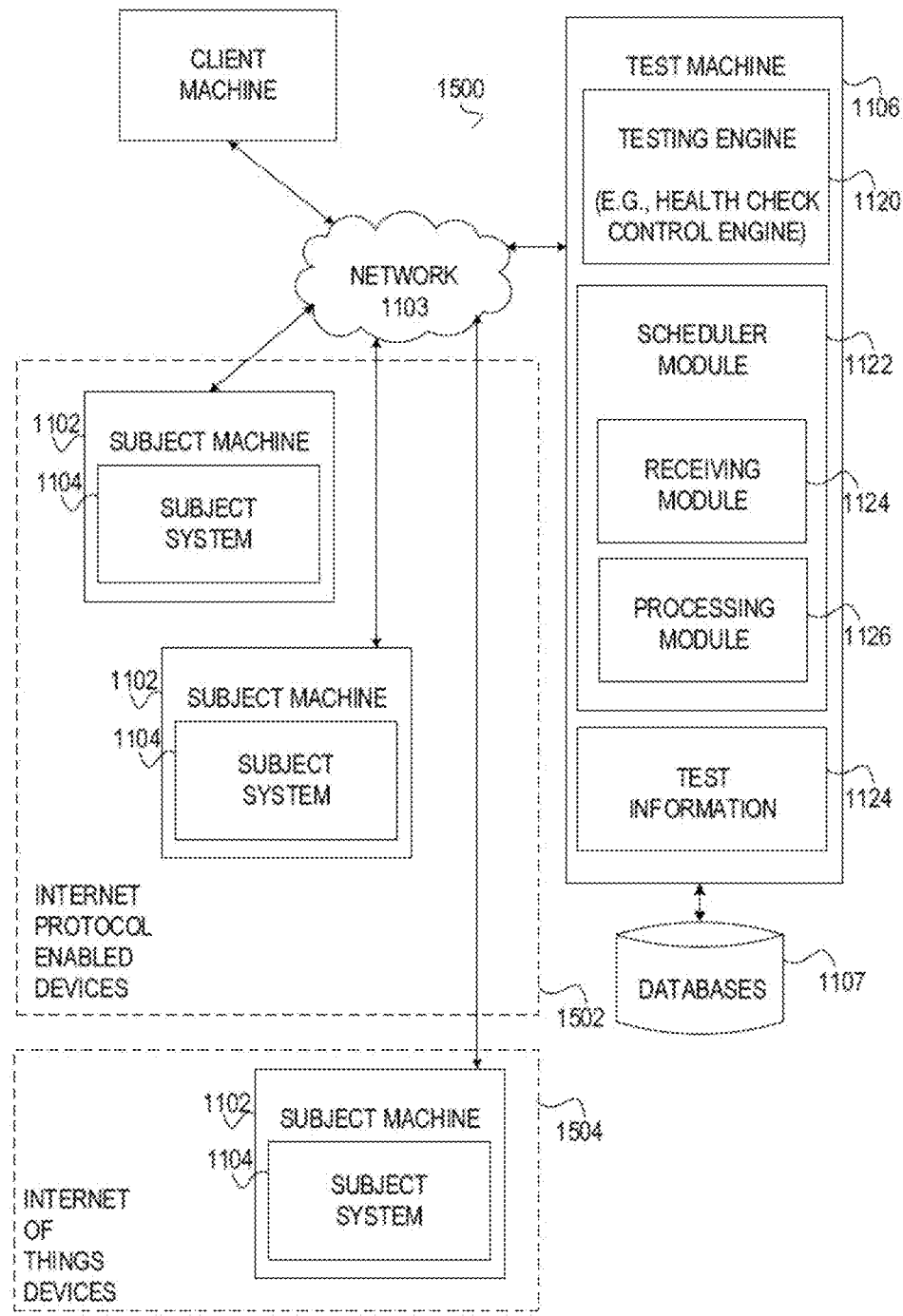
FIG. 13A is a block diagram illustrating an improved system for testing a subject system in a heartbeat testing process utilizing one or more digital computers, according to an example embodiment.

FIG. 13A is a block diagram illustrating an improved system 1500 for testing a subject system in a heartbeat testing process utilizing one or more digital computers, according to an example embodiment. The system 1500 includes Internet Protocol (IP) enabled devices 1502 including multiple subject machines 1102 including subject systems 1104 and Internet of Things (IoT) devices including multiple subject machines 1102 including subject systems 1104. The system 1500 corresponds to the system 1100 in FIG. 9A, accordingly, the same or similar references have been used to indicate the same or similar features unless otherwise indicated. The IP-enabled devices 1502 may include devices communicating over a network with Internet Protocol, the principal communications protocol in the Internet protocol suite for relating datagrams across network boundaries, its routing function enabling internetworking, and essentially establishing the Internet. The IoT devices 1504 comprise a network of physical devices, vehicles, home appliances and other items embedded with electronics, software, sensors, actuators, and network connectivity which enables these objects to connect and exchange data. The IP enabled devices 1502 may communicate among themselves and with IoT devices 1504. The testing engine 1120 may be embodied as a health check control engine. The health check control engine may communicate heartbeat information to the IP-enabled devices 1502 and the IoT devices 1504. The heartbeat information may require the IP-enabled devices 1502 and the IoT devices to respond to the receipt of the heartbeat information by communicating the heartbeat information back to the health check control engine. The periodic exchange of the heartbeat information ensures that the IP-enabled devices 1502 and the IoT devices 1504 are alive and capable of responding. No exchange of heartbeat information for a predefined period (e.g. one minute) may be defined as an intermittent failure with an intermittent value of "0" or "FAIL." Accordingly, the testing engine 1120 (e.g., health check control engine) may be utilized to automatically execute tests (e.g., scripts, modules, applications, etc.) and to register test results in the form of Boolean states (e.g., "PASS" or "FAIL") in the test information 1124. The testing engine 1120 (e.g. health check control engine) may generate an intermittency value 1136 and or a severity value 1138 for a device. If the testing engine 1120 determines an intermittency value 1136 for an IP-enabled device 1502 or an IoT device 1504 exceeds a predetermined threshold (e.g. 0.6) then the testing engine 1120 may trigger the communication of a warning alert for the device. For example, the test machine 1106 may communicate the warning alert over the network to a preconfigured backup device. Further, if the testing engine 1120 determines a severity value 1138 for an IP-enabled device 1502 or an IoT device 1504 exceeds a predetermined threshold (e.g. 0.6) then the testing engine 1120 may trigger the communication of an error alert for the device. For example, the test machine 1106 may communicate the error alert over the network to a preconfigured backup device.

Figure 13B:
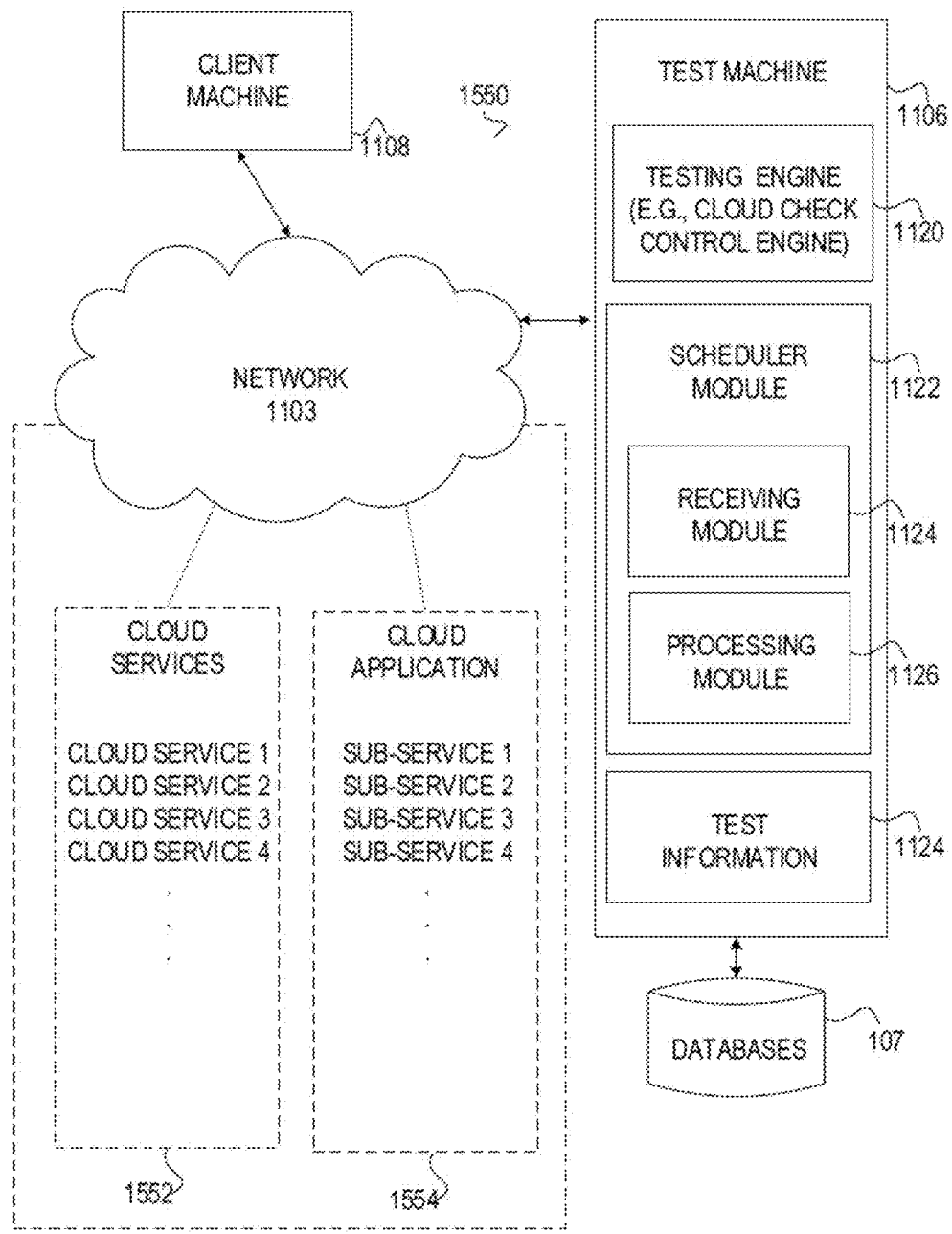
FIG. 13B is a block diagram illustrating an improved system for testing a subject system in an availability testing process utilizing one or more digital computers, according to an example embodiment.

FIG. 13B is a block diagram illustrating a system 1550, according to an embodiment, that is improved and for testing a subject system in an availability testing process utilizing one or more digital computers. The system 1550 may include multiple cloud services 1552 or multiple cloud application sub-services 1554. Each of the cloud services or the cloud application sub-services 1554 may be analogous to the subject machines 1102 including subject systems 1104, as previously described. The system 1550 corresponds to the system 1100 in FIG. 9A, accordingly, the same or similar references have been used to indicate the same or similar features unless otherwise indicated. The cloud services 1552 may communicate over the network 1103 providing various services to one or more devices (e.g., client machine 1108). Similarly, each of the cloud application sub-services 1554 may communicate over the network 1103 providing services to one or more devices (e.g., client machine 1108). Accordingly, the cloud services 1552 may communicate over the network 1103 with other devices. The testing engine 1120 may be embodied as a cloud check control engine. The cloud check control engine may communicate availability information to the cloud services 1552 and cloud application sub-services 1554. The availability information may require the IP cloud services 1552 and cloud application sub-services 1554 to respond to the receipt of the availability information by sending the availability information back to the cloud check control engine. The periodic exchange of the availability information ensures that the cloud services 1552 and cloud application sub-services 1554 are available to provide service to the devices. The intermittency metric 1141 and the severity metric 1170 may be applied as meta-metrics for the cloud service 1552 or the cloud application sub-services 1554 (e.g. availability). For example, if the industry average availability is 99.91% for the cloud services 1552 and the measurement unit is monthly, service availability <99.91% can be defined as an intermittent failure with value=0 (E.G., FAIL).

The system 1550 may further be utilized for testing the subject system 1550 in a latency testing process utilizing one or more digital computers, according to an embodiment. The cloud check control engine may further measure the amount of elapsed time (e.g., latency) by receiving a first timestamp registering a receipt of the availability information at the cloud services 1552 or at the sub-service of the cloud application 1554 and receiving a second-time stamp registering the cloud services 1552 or the sub-service of the cloud application 1554 sending the availability information back to the cloud check control engine. The cloud check control engine may generate a measure of latency by subtracting first stamp from the second-time stamp. The intermittency metric 1141 and the severity metric 1170 may be applied as meta-metrics for the cloud service 1552 or the sub-services of the cloud application 1554 (e.g. latency). For example, if the industry average latency is 1 millisecond for the cloud services 1552 and the measurement unit is hourly, service latency >1 millisecond may be defined as an intermittent failure with value=0 (E.G., FAIL).

Figure 13C:
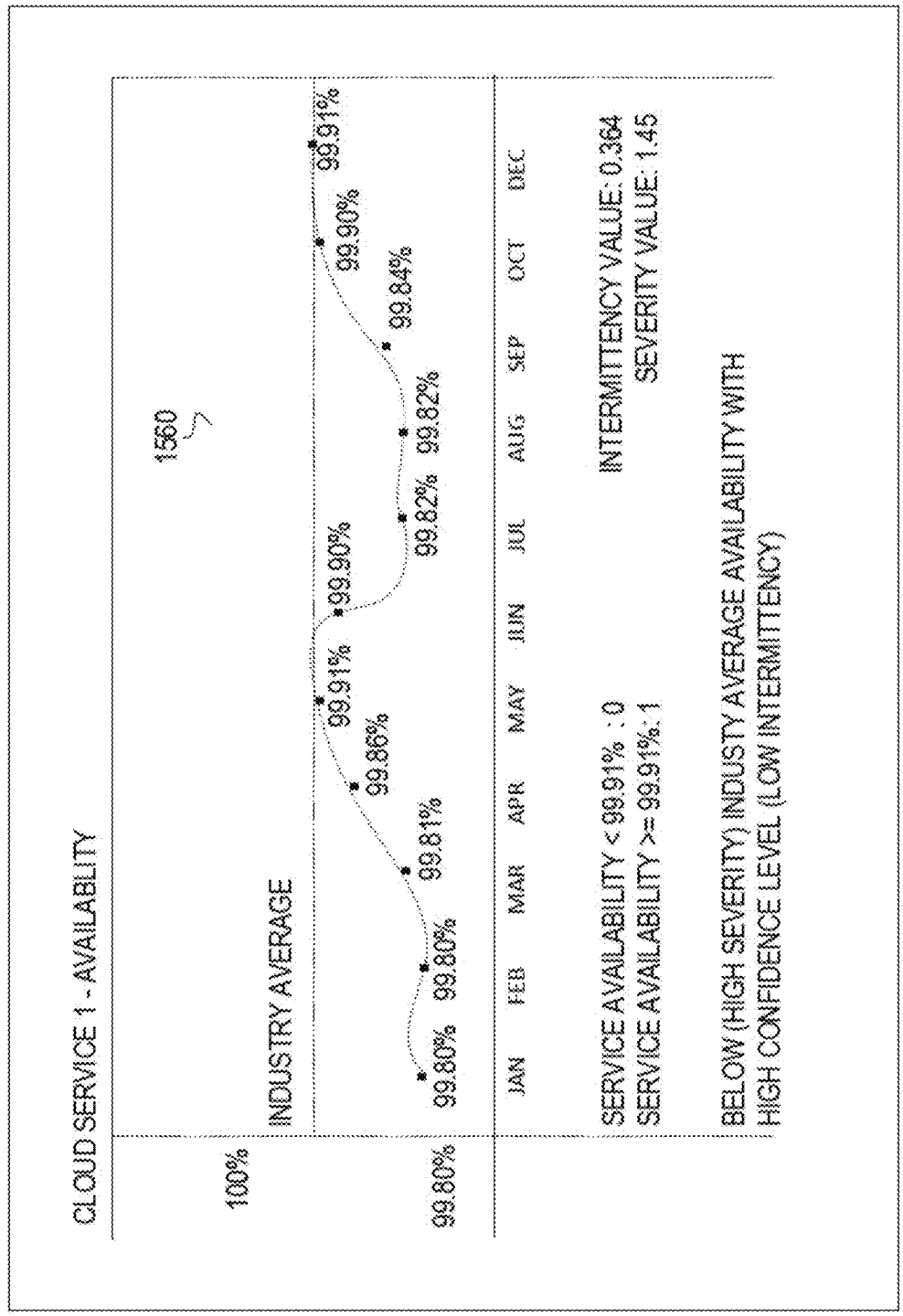
FIG. 13C is a graph, according to an embodiment, illustrating a cloud service availability for a first cloud service.

FIG. 13C is a graph 1560, according to an embodiment, illustrating a cloud service availability for a first cloud service. The graph 1560 includes a horizontal line signifying the industry average of cloud service availability as being 99.91% and monthly measurements of cloud service availability. The graph 1560 further shows an intermittency value 1136 of "0.364" and a severity value 1138 of "1.45" as being generated based on the monthly data.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in the present application are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of things," while yet another combination produces a server computer for use within a cloud computing architecture. Not all combinations of such software and hardware architectures are presented here as those of skill in the art can readily understand how to implement the subject matter of the disclosure in different contexts from the disclosure contained herein.

Software Architecture

Figure 14:
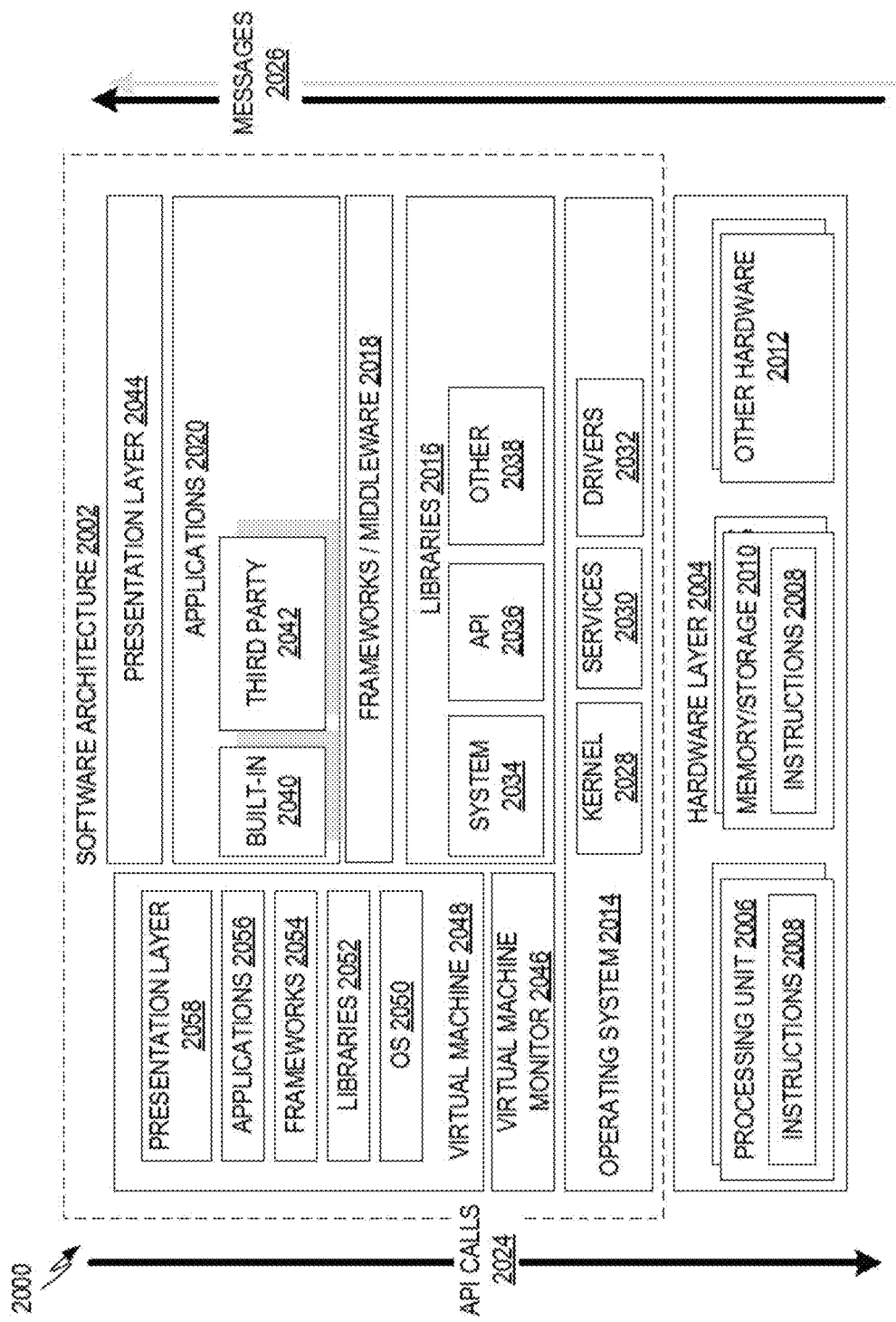
FIG. 14 is a block diagram illustrating a representative software architecture, which may be used in conjunction with various hardware architectures herein described.

FIG. 14 is a block diagram 2000 illustrating a representative software architecture 2002, which may be used in conjunction with various hardware architectures herein described. FIG. 14 is merely a non-limiting example of a software architecture and it will be appreciated that many other architectures may be implemented to facilitate the functionality described herein. The software architecture 2002 may be executing on hardware such as machine 2100 of FIG. 15 that includes, among other things, processors 2110, memory/storage 2130, and input/output (I/O) components 2150. A representative hardware layer 2004 is illustrated and can represent, for example, the machine 2100 of FIG. 15. The representative hardware layer 2004 comprises one or more processing units 2006 having associated executable instructions 2008. Executable instructions 2008 represent the executable instructions 2008 of the software architecture 2002, including implementation of the methods and modules in the present application. Hardware layer 2004 also includes memory and/or storage modules 2010, which also have executable instructions 2008. Hardware layer 2004 may also comprise other hardware 2012, which represents any other hardware of the hardware layer 2004, such as the other hardware illustrated as part of machine 2100.

In the example architecture of FIG. 14, the software architecture 2002 may be conceptualized as a stack of layers where each layer provides particular functionality. For example, the software architecture 2002 may include layers such as an operating system 2014, libraries 2016, frameworks/middleware 2018, applications 2020, and presentation layer 2044. Operationally, the applications 2020 and/or other components within the layers may invoke API calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules, as described herein.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system 2014 or platform.

The applications 2020 include built-in applications 2040 and/or third-party applications 2042 and/or product title applications 104 and the like. Examples of representative built-in applications 2040 may include, but are not limited to, a contacts application, a browser application, a book reader application, a location application, a media application, a messaging application, and/or a game application. Third-party applications 2042 may include any of the built-in applications 2040 as well as a broad assortment of other applications. In a specific example, the third-party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 2042 may invoke the API calls 2024 provided by the mobile operating system such as operating system 2014 to facilitate functionality described herein.

The applications 2020 may utilize built-in operating system functions (e.g., kernel 2028, services 2030 and/or drivers 2032), libraries (e.g., system libraries 2034, API libraries 2036, and other libraries 2038), frameworks/middleware 2018 to create user interfaces to interact with users of the system. Alternatively, or additionally, in some systems interactions with a user may occur through a presentation layer, such as presentation layer 2044. In these systems, the application/module "logic" can be separated from the aspects of the application/module that interact with a user.

Some software architectures utilize virtual machines. In the example of FIG. 14, this is illustrated by virtual machine 2048. A virtual machine 2048 creates a software environment where applications 2020/modules can execute as if they were executing on a hardware machine (such as the machine 2100 of FIG. 15, for example). A virtual machine 2048 is hosted by a host operating system (operating system 2014 in FIG. 14) and typically, although not always, has a virtual machine monitor 2046, which manages the operation of the virtual machine 2048 as well as the interface with the host operating system (i.e., operating system 2014). A software architecture executes within the virtual machine 2048 such as an operating system 2050, libraries 2052, frameworks/middleware 2054, applications 2056 and/or presentation layer 2058. These layers of software architecture executing within the virtual machine 2048 can be the same as corresponding layers previously described or may be different.

Example Machine Architecture and Machine-Readable Medium

Figure 15:
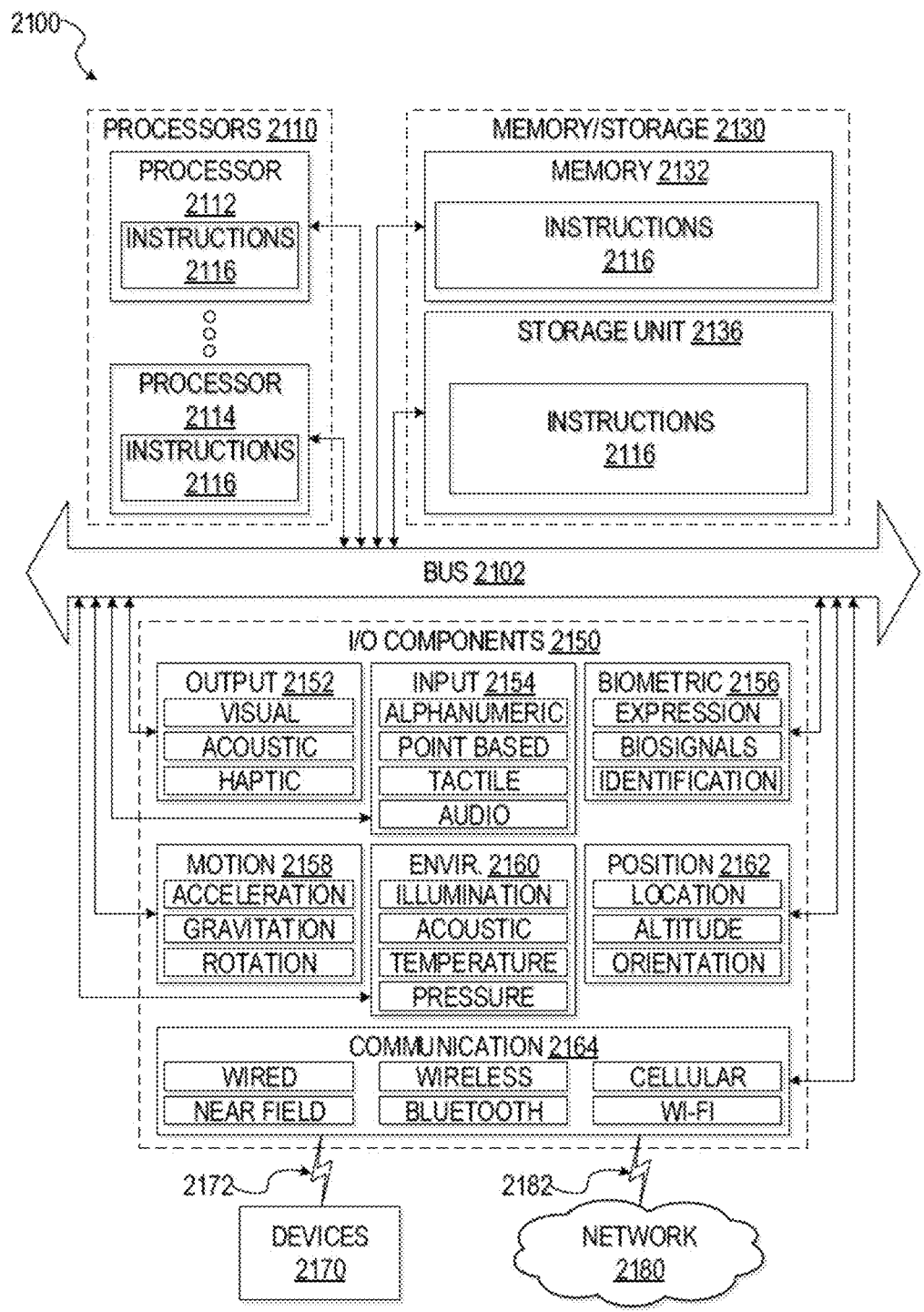
FIG. 15 is a block diagram illustrating a machine, according to some example embodiments.

FIG. 15 is a block diagram illustrating components of a machine 2100, according to some example embodiments, able to read instructions 2116 from a machine-readable medium (e.g., a machine-readable storage medium) and perform any one or more of the methodologies discussed herein. Specifically, FIG. 15 shows a diagrammatic representation of the machine 2100 in the example form of a computer system, within which instructions 2116 (e.g., software, a program, an application 2020, an applet, an app, or other executable code) for causing the machine 2100 to perform any one or more of the methodologies discussed herein may be executed. For example, the instructions 2116 may cause the machine 2100 to execute the flow diagrams of FIGS. 5A, 6A, 6B, 7D, 11A, 11B, 11C, and 11D. Additionally, or alternatively, the instructions 2116 may implement the system 100 of FIG. 1, the system 108 of FIG. 2, the system 300 of FIG. 3, the system 108 of FIG. 4, the system 1100 of FIG. 9A, system 1500 of FIG. 13A, system 1550 of FIG. 13B the software architecture 2002 of FIG. 14, and so forth. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, processor 2112 and processor 2114 that may execute instructions 2116. The term "processor" is intended to include a multi-core processor 2110 that may comprise two or more independent processors 2112, 2114 (sometimes referred to as "cores") that may execute instructions 2116 contemporaneously. Although FIG. 15 shows multiple processors 2112, 2114, the machine 2100 may include a single processor 2112 with a single core, a single processor 2112 with multiple cores (e.g., a multi-core processor), multiple processors 2112, 2114 with a single core, multiple processors 2112, 2114 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions 2116, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine 2100. For example, portable machines such as mobile phones will likely include a touch input device or other such input mechanisms, while a headless server machine will likely not include such a touch input device. It will be appreciated that the I/O components 2150 may include many other components that are not shown in FIG. 15. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172, respectively. For example, the communication components 2164 may include a network interface component or other suitable device to interface with the network 2180. In further examples, communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as UPC bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of example embodiments of the present disclosure as represented by the appended claims. The specification and drawings are, accordingly, to be regarded in an illustrative rather than a restrictive sense.

We claim:

1. A method for testing a subject system with a software testing process, the method comprising:
    receiving a plurality of Boolean states responsive to repeatedly applying a first test case to a subject system including a software build system that includes a version of a first software feature comprised of software instructions, each Boolean state signifying an outcome of an application of the first test case to the version of the first software feature over a span of time;
    identifying, by a hardware processor, test case outcomes for the first test case that are adjacent in time and different;
    generating an intermittency value for the first test case based on the test case outcomes for the first test case that are adjacent in time and different;
    determining that the intermittency value for the first test case exceeds an intermittency threshold;
    alerting an engineering resource responsive to the determining the intermittency value for the first test case exceeds an intermittency threshold, the alerting the engineering resource including communicating an electronic message over a communications network; and
    repeating the above operations until the intermittency value for the first test case does not exceed the intermittency threshold.

2. The method of claim 1, wherein the communicating the electronic message over the communications network includes one or more of:
    communicating the electronic message over at least one of an internal network and an external network,
    routing the electronic message over the communications network to at least one of a first engineering resource and a second engineering resource,
    and wherein the electronic message includes a plurality of operations including a first operation to request a scheduling of the engineering resource and a second operation to assign a task to the engineering resource,
    and wherein the request to schedule the engineering resource includes a request to identify of an availability of a period time of the engineering resource and a request to allocate the period of time of the engineering resource,
    and wherein the request to assign the engineering resource includes a request to assign the engineering resource to the first test case to debug software instructions associated with the first test case, the software instructions being included in the subject system.

3. The method of claim 1, wherein the repeating the above operations comprises:
    repeatedly applying the first test case to a different version of the software build system including a different version of the first software feature; and
    repeatedly scheduling an engineering resource until a recalculated intermittency value for an application of the first test case does not exceed the intermittency threshold.

4. The method of claim 1, further comprising:
    applying a plurality of test cases to the software build system, the applying the plurality of test cases including the repeatedly applying the first test case to the subject system and repeatedly applying a second plurality of second test cases to the subject system.

5. The method of claim 1, wherein the identifying test case outcomes for the first test case that are adjacent in time and different comprises:
    storing the plurality of Boolean states in a status array comprised of a plurality of status elements;
    generating a gap array based on the status array, the gap array including a plurality of gap elements including a gap element for registering a gap assertion responsive to identifying status elements that are adjacent and registering different test case outcomes;
    counting asserted gap elements in the gap array to generate an intermittency numerator; and
    counting gap elements in the gap array to generate an intermittency denominator.

6. The method of claim 1, wherein the identifying test case outcomes for the first test case that are adjacent in time and different comprises:
    storing the plurality of Boolean states in a status array comprised of a plurality of status elements;
    generating a gap array based on the status array, the gap array including a plurality of gap elements including a gap element for registering a gap assertion responsive to identifying status elements that are adjacent and registering different test case outcomes;
counting asserted gap elements in the gap array to generate an intermittency numerator;
counting gap elements in the gap array to generate an intermittency denominator; and,
wherein the generating the intermittency value includes dividing the intermittency numerator by the intermittency denominator.

7. The method of claim 1, wherein the identifying test case outcomes for the first test case that are adjacent in time and different comprises:
storing the plurality of Boolean states in a status array comprised of a plurality of status elements;
generating a gap array based on the status array, the gap array including a plurality of gap elements including a gap element for registering a gap assertion responsive to identifying status elements that are adjacent and registering different test case outcomes;
counting asserted gap elements in the gap array to generate an intermittency numerator;
counting gap elements in the gap array to generate an intermittency denominator; and, further comprising:
generating a severity value for the first test case based on the status array, the severity value for the first test case increasing in value responsive to identifying a status element in the status array as signifying a failure of the first test case.

8. The method of claim 1, wherein the identifying test case outcomes for the first test case that are adjacent in time and different comprises:
storing the plurality of Boolean states in a status array comprised of a plurality of status elements;
generating a gap array based on the status array, the gap array including a plurality of gap elements including a gap element for registering a gap assertion responsive to identifying status elements that are adjacent and registering different test case outcomes;
counting asserted gap elements in the gap array to generate an intermittency numerator;
counting gap elements in the gap array to generate an intermittency denominator; and wherein the status array includes a first status element registering a first test case outcome as failed, the first status element corresponding to a first application of the first test case, the status array includes a second status element registering a second test case outcome as failed, the second status element corresponding to a second application of the first test case, the second test outcome is registered as occurring later in the span of time than the first test case outcome; and further comprising:
generating a severity value measuring the second test case outcome; and
generating a severity value measuring the first test case outcome; and wherein the severity value measuring the second test case outcome is greater than the severity value measuring the second test case outcome.

9. The method of claim 1, wherein the identifying test case outcomes for the first test case that are adjacent in time and different comprises:
storing the plurality of Boolean states in a status array comprised of a plurality of status elements;
generating a gap array based on the status array, the gap array including a plurality of gap elements including a gap element for registering a gap assertion responsive to identifying status elements that are adjacent and registering different test case outcomes;
counting asserted gap elements in the gap array to generate an intermittency numerator;
counting gap elements in the gap array to generate an intermittency denominator; and wherein the status array includes a first status element registering a first test case outcome as failed, the first status element corresponding to a first application of the first test case, the status array includes a second status element registering a second test case outcome as failed, the second status element corresponding to a second application of the first test case, the second test outcome is registered as occurring later in the span of time than the first test case outcome; and further comprising:
generating a severity value measuring the second test case outcome; and
generating a severity value measuring the first test case outcome; and wherein the severity value measuring the second test case outcome is greater than the severity value measuring the second test case outcome, and wherein the severity value measuring the first test case outcome is added to the severity value measuring the second test case outcome to generate the severity value for the first test case.

10. The method of claim 1, further comprising generating a severity value measuring the first test case by utilizing a severity equation comprising:

$$\text{Severity Value} = B\sum_{i=0}^{L-1} F_i e^{-u(L-1-i)}$$

where a value "B" is a base severity value, a value "L" is a length of a status array, a value "Fi" is opposite of a value of a status element at an index "i" of the status array, and a value "u" is an attenuation factor.

11. The method of claim 1, further comprising:
applying a plurality of test cases to the software build system; the plurality of test cases including a first test case and a second test case, the applying comprising:
applying a first plurality of tests for the first test case to the subject system, and
applying a second plurality of tests for the second test case to the subject system; and
prioritizing the intermittency value and a severity value for the first test case, comprising:
ranking the intermittency value for the first plurality of tests for the first test case based on a high intermittency threshold,
ranking the severity value for the first plurality of tests for the first test case based on a high severity threshold,
prioritizing the intermittency value and the severity value for the first plurality of tests for first test case to generate a priority value for the first test case, and
storing the priority value for the first plurality of first plurality of tests for the first test case in test information.

12. A system for testing a subject system with a software testing process comprising:
at least one processor and executable instructions accessible on a computer-readable medium that, when executed, cause the at least one processor to perform operations comprising:
receiving a plurality of Boolean states responsive to repeatedly applying a first test case to a subject system including a software build system that includes a version of a first software feature comprised of software instructions, each Boolean state signifying an outcome of an application of the first test case to the version of the first software feature over a span of time;

identifying test case outcomes for the first test case that are adjacent in time and different;

generating an intermittency value for the first test case based on the test case outcomes for the first test case that are adjacent in time and different;

determining that the intermittency value for the first test case exceeds an intermittency threshold;

alerting an engineering resource responsive to the determining the intermittency value for the first test case exceeds an intermittency threshold, the alerting the engineering resource including communicating an electronic message over a communications network; and repeating the above operations until the intermittency value for the first test case does not exceed the intermittency threshold.

13. The system of claim 12, wherein the communicating the electronic message over the network includes communicating the electronic message over at least one of an internal network and an external network.

14. The system of claim 12, wherein the repeating the above operations comprises:

repeatedly applying the first test case to a different version of the software build system including a different version of the first software feature; and repeatedly scheduling an engineering resource until a recalculated intermittency value for an application of the first test case does not exceed the intermittency threshold.

15. The system of claim 12, wherein the identifying test case outcomes for the first test case that are adjacent in time and different comprises:

storing the plurality of Boolean states in a status array comprised of a plurality of status elements;

generating a gap array based on the status array, the gap array including a plurality of gap elements including a gap element for registering a gap assertion responsive to identifying status elements that are adjacent and registering different test case outcomes;

counting asserted gap elements in the gap array to generate an intermittency numerator; and counting gap elements in the gap array to generate an intermittency denominator.

16. The system of claim 12, wherein the identifying test case outcomes for the first test case that are adjacent in time and different comprises:

storing the plurality of Boolean states in a status array comprised of a plurality of status elements;

generating a gap array based on the status array, the gap array including a plurality of gap elements including a gap element for registering a gap assertion responsive to identifying status elements that are adjacent and registering different test case outcomes;

counting asserted gap elements in the gap array to generate an intermittency numerator;

counting gap elements in the gap array to generate an intermittency denominator; and, wherein the generating the intermittency value includes dividing the intermittency numerator by the intermittency denominator.

17. The system of claim 12, wherein the identifying test case outcomes for the first test case that are adjacent in time and different comprises:

storing the plurality of Boolean states in a status array comprised of a plurality of status elements;

generating a gap array based on the status array, the gap array including a plurality of gap elements including a gap element for registering a gap assertion responsive to identifying status elements that are adjacent and registering different test case outcomes;

counting asserted gap elements in the gap array to generate an intermittency numerator;

counting gap elements in the gap array to generate an intermittency denominator; and, further comprising:

generating a severity value for the first test case based on the status array, the severity value for the first test case increasing in value responsive to identifying a status element in the status array as signifying a failure of the first test case.

18. The system of claim 12, wherein the identifying test case outcomes for the first test case that are adjacent in time and different comprises:

storing the plurality of Boolean states in a status array comprised of a plurality of status elements;

generating a gap array based on the status array, the gap array including a plurality of gap elements including a gap element for registering a gap assertion responsive to identifying status elements that are adjacent and registering different test case outcomes;

counting asserted gap elements in the gap array to generate an intermittency numerator;

counting gap elements in the gap array to generate an intermittency denominator; and wherein the status array includes a first status element registering a first test case outcome as failed, the first status element corresponding to a first application of the first test case, the status array includes a second status element registering a second test case outcome as failed, the second status element corresponding to a second application of the first test case, the second test outcome is registered as occurring later in the span of time than the first test case outcome; and further comprising:

generating a severity value measuring the second test case outcome; and generating a severity value measuring the first test case outcome; and wherein the severity value measuring the second test case outcome is greater than the severity value measuring the second test case outcome.

19. The system of claim 12, wherein the identifying test case outcomes for the first test case that are adjacent in time and different comprises:

storing the plurality of Boolean states in a status array comprised of a plurality of status elements;

generating a gap array based on the status array, the gap array including a plurality of gap elements including a gap element for registering a gap assertion responsive to identifying status elements that are adjacent and registering different test case outcomes;

counting asserted gap elements in the gap array to generate an intermittency numerator;

counting gap elements in the gap array to generate an intermittency denominator; and wherein the status array includes a first status element registering a first test case outcome as failed, the first status element corresponding to a first application of the first test case, the status array includes a second status element registering a second test case outcome as failed, the second status element corresponding to a second application of the first test case, the second test outcome is registered as occurring later in the span of time than the first test case outcome; and further comprising:

generating a severity value measuring the second test case outcome; and generating a severity value measuring the first test case outcome; and wherein the severity value measuring the second test case outcome is greater than the severity value measuring the second test case outcome, and wherein the severity value measuring the first test case outcome is added to the severity value measuring the second test case outcome to generate the severity value for the first test case.

20. The system of claim 12, further comprising generating a severity value measuring the first test case by utilizing a severity equation comprising:

$$\begin{array}{c} \text{Severity} \\ \text{Value} \end{array} = B \sum_{i=0}^{L-1} F_i e^{-u(L-1-i)}$$

where a value "B" is a base severity value, a value "L" is a length of a status array, a value "Fi" is opposite of a value of a status element at an index "i" of the status array, and a value "u" is an attenuation factor.

21. The system of claim 12, further comprising:
applying a plurality of test cases to the software build system, the plurality of test cases including a first test case and a second test case, the applying comprising:
applying a first plurality of tests for the first test case to the subject system, and
applying a second plurality of tests for the second test case to the subject system; and
prioritizing the intermittency value and a severity value for the first test case, comprising:
ranking the intermittency value for the first plurality of tests for the first test case based on a high intermittency threshold,
ranking the severity value for the first plurality of tests for the first test case based on a high severity threshold,
prioritizing the intermittency value and the severity value for the first plurality tests for the first test case to generate a priority value for the first test case, and
storing the priority value for the first plurality of tests for the first test case in test information.

22. A computer readable medium having no transitory signals and comprising instructions that, when executed on a processor, cause the processor to perform one or more operations comprising:
receiving a plurality of Boolean states responsive to repeatedly applying a first test case to a subject system including a software build system that includes a version of a first software feature comprised of software instructions, each Boolean state signifying an outcome of an application of the first test case to the version of the first software feature over a span of time;
identifying test case outcomes for the first test case that are adjacent in time and different;
generating an intermittency value for the first test case based on the test case outcomes for the first test case that are adjacent in time and different;
determining that the intermittency value for the first test case exceeds an intermittency threshold;
alerting an engineering resource responsive to the determining the intermittency value for the first test case exceeds an intermittency threshold; the alerting the engineering resource including communicating an electronic message over a communications network; and
repeating the above operations until the intermittency value for the first test case does not exceed the intermittency threshold.

23. The computer readable medium of claim 22, wherein the communicating the electronic message over the network includes communicating the electronic message over at least one of an internal network and an external network.

24. The computer readable medium of claim 22, wherein the repeating the above operations comprises:
repeatedly applying the first test case to a different version of the software build system including a different version of the first software feature; and
repeatedly scheduling an engineering resource until a recalculated intermittency value for an application of the first test case does not exceed the intermittency threshold.

25. The computer readable medium of claim 22, wherein the identifying test case outcomes for the first test case that are adjacent in time and different comprises:
storing the plurality of Boolean states in a status array comprised of a plurality of status elements;
generating a gap array based on the status array, the gap array including a plurality of gap elements including a gap element for registering a gap assertion responsive to identifying status elements that are adjacent and registering different test case outcomes;
counting asserted gap elements in the gap array to generate an intermittency numerator; and
counting gap elements in the gap array to generate an intermittency denominator.

26. The computer readable medium of claim 22, wherein the identifying test case outcomes for the first test case that are adjacent in time and different comprises:
storing the plurality of Boolean states in a status array comprised of a plurality of status elements;
generating a gap array based on the status array, the gap array including a plurality of gap elements including a gap element for registering a gap assertion responsive to identifying status elements that are adjacent and registering different test case outcomes;
counting asserted gap elements in the gap array to generate an intermittency numerator;
counting gap elements in the gap array to generate an intermittency denominator; and, wherein the generating the intermittency value includes dividing the intermittency numerator by the intermittency denominator.

27. The computer readable medium of claim 22, wherein the identifying test case outcomes for the first test case that are adjacent in time and different comprises:
storing the plurality of Boolean states in a status array comprised of a plurality of status elements;
generating a gap array based on the status array, the gap array including a plurality of gap elements including a gap element for registering a gap assertion responsive to identifying status elements that are adjacent and registering different test case outcomes;
counting asserted gap elements in the gap array to generate an intermittency numerator;
counting gap elements in the gap array to generate an intermittency denominator; and, further comprising:
generating a severity value for the first test case based on the status array, the severity value for the first test case increasing in value responsive to identifying a status element in the status array as signifying a failure of the first test case.

28. The computer readable medium of claim 22, wherein the identifying test case outcomes for the first test case that are adjacent in time and different comprises:
storing the plurality of Boolean states in a status array comprised of a plurality of status elements;
generating a gap array based on the status array, the gap array including a plurality of gap elements including a gap element for registering a gap assertion responsive to identifying status elements that are adjacent and registering different test case outcomes;
counting asserted gap elements in the gap array to generate an intermittency numerator;
counting gap elements in the gap array to generate an intermittency denominator; and wherein the status array includes a first status element registering a first test case outcome as failed, the first status element corresponding to a first application of the first test case, the status array includes a second status element registering a second test case outcome as failed, the second status element corresponding to a second application of the first test case, the second test outcome is registered as occurring later in the span of time than the first test case outcome; and further comprising:
generating a severity value measuring the second test case outcome; and
generating a severity value measuring the first test case outcome; and wherein the severity value measuring the second test case outcome is greater than the severity value measuring the second test case outcome.

29. The computer readable medium of claim 22, wherein the identifying test case outcomes for the first test case that are adjacent in time and different comprises:
storing the plurality of Boolean states in a status array comprised of a plurality of status elements;
generating a gap array based on the status array, the gap array including a plurality of gap elements including a gap element for registering a gap assertion responsive to identifying status elements that are adjacent and registering different test case outcomes;
counting asserted gap elements in the gap array to generate an intermittency numerator;
counting gap elements in the gap array to generate an intermittency denominator; and wherein the status array includes a first status element registering a first test case outcome as failed, the first status element corresponding to a first application of the first test case, the status array includes a second status element registering a second test case outcome as failed, the second status element corresponding to a second application of the first test case, the second test outcome is registered as occurring later in the span of time than the first test case outcome; and further comprising:
generating a severity value measuring the second test case outcome; and
generating a severity value measuring the first test case outcome; and wherein the severity value measuring the second test case outcome is greater than the severity value measuring the second test case outcome, and wherein the severity value measuring the first test case outcome is added to the severity value measuring the second test case outcome to generate the severity value for the first test case.

* * * * *

UNITED STATES PATENT AND TRADEMARK OFFICE
CERTIFICATE OF CORRECTION

PATENT NO. : 10,831,648 B2
APPLICATION NO. : 16/263363
DATED : November 10, 2020
INVENTOR(S) : Zhang et al.

Page 1 of 1

It is certified that error appears in the above-identified patent and that said Letters Patent is hereby corrected as shown below:

In the Claims

In Column 62, Line 23, in Claim 2, after "period", insert --of--

In Column 64, Line 35, in Claim 10, delete ""Fi"" and insert --"$F_i$"-- therefor In Column 64, Line 40, in Claim 11, delete "system;" and insert --system,-- therefor In Column 67, Line 26, in Claim 20, delete ""Fi"" and insert --"$F_i$"-- therefor In Column 68, Line 3, in Claim 22, delete "threshold;" and insert --threshold,-- therefor Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*